(12) United States Patent
Holme et al.

(10) Patent No.: US 9,859,560 B2
(45) Date of Patent: Jan. 2, 2018

(54) ELECTRODE MATERIALS WITH MIXED PARTICLE SIZES

(71) Applicant: QuantumScape Corporation, San Jose, CA (US)

(72) Inventors: Tim Holme, Mountain View, CA (US); Ken Desmond, Phillipsburg, NJ (US); Weston Arthur Hermann, Palo Alto, CA (US); Joseph Han, Redwood City, CA (US); Zhebo Chen, Mountain View, CA (US)

(73) Assignee: QuantumScape Corporation, San Jose, CA (US)

( * ) Notice: Subject to any disclaimer, the term of this patent is extended or adjusted under 35 U.S.C. 154(b) by 284 days.

(21) Appl. No.: 14/724,611

(22) Filed: May 28, 2015

(65) Prior Publication Data

US 2015/0357644 A1    Dec. 10, 2015

Related U.S. Application Data

(60) Provisional application No. 62/007,416, filed on Jun. 4, 2014.

(51) Int. Cl.
*H01M 4/58* (2010.01)
*H01M 4/62* (2006.01)
(Continued)

(52) U.S. Cl.
CPC ......... *H01M 4/5825* (2013.01); *H01M 4/485* (2013.01); *H01M 10/052* (2013.01);
(Continued)

(58) Field of Classification Search
CPC .......... H01M 10/052; H01M 10/0525; H01M 10/0562; H01M 2004/021;
(Continued)

(56) References Cited

U.S. PATENT DOCUMENTS

| | | |
|---|---|---|
| 6,210,836 B1 | 4/2001 | Takada et al. |
| 6,277,524 B1 | 8/2001 | Kanno |

(Continued)

FOREIGN PATENT DOCUMENTS

| | | |
|---|---|---|
| JP | 2001316583 | 11/2001 |
| JP | 2007273217 | 10/2007 |

(Continued)

OTHER PUBLICATIONS

Brouwers, H.J.H. "Particle-size distribution and packing fraction of geometric random packages" The American Physical Society, pp. 031309-1 to 031309-14.

(Continued)

*Primary Examiner* — Carlos Barcena
(74) *Attorney, Agent, or Firm* — Squire Patton Boggs (US) LLP

(57) ABSTRACT

The present invention is directed to electrochemical devices and materials thereof. More specifically, embodiments set forth herein provide a low-porosity electrode that includes large particles and small particles. The large particles include electrochemically active material. The small particles include ion conductive electrolyte materials. In some examples, the large particles and small particles are characterized by a dispersity of no higher than 0.5. There are other embodiments as well.

22 Claims, 27 Drawing Sheets

(51) Int. Cl.
*H01M 4/485* (2010.01)
*H01M 10/0525* (2010.01)
*H01M 10/052* (2010.01)
*H01M 10/0562* (2010.01)
*H01M 4/02* (2006.01)

(52) U.S. Cl.
CPC ... *H01M 10/0525* (2013.01); *H01M 10/0562* (2013.01); *H01M 4/622* (2013.01); *H01M 4/625* (2013.01); *H01M 2004/021* (2013.01); *H01M 2220/20* (2013.01); *H01M 2220/30* (2013.01); *H01M 2300/0068* (2013.01)

(58) Field of Classification Search
CPC ......... H01M 2220/20; H01M 2220/30; H01M 2300/0068; H01M 4/485; H01M 4/5825; H01M 4/622; H01M 4/625
See application file for complete search history.

(56) References Cited

U.S. PATENT DOCUMENTS

| | | | |
|---|---|---|---|
| 6,365,300 | B1 | 4/2002 | Ota et al. |
| 6,656,641 | B1 | 12/2003 | Kumar |
| 7,416,815 | B2 | 8/2008 | Ota et al. |
| 7,901,598 | B2 | 3/2011 | Ota |
| 8,524,393 | B2 | 9/2013 | Kojima |
| 8,546,019 | B2 | 10/2013 | Lee et al. |
| 8,697,292 | B2 | 4/2014 | Kanno |
| 8,729,866 | B2 | 5/2014 | Tamane et al. |
| 8,871,391 | B2 | 10/2014 | Liang et al. |
| 8,962,194 | B2 | 2/2015 | Senga et al. |
| 9,172,112 | B2 | 10/2015 | Hama et al. |
| 9,172,113 | B2 | 10/2015 | Ohtomo et al. |
| 9,634,354 | B2 | 4/2017 | Chao et al. |
| 2002/0122971 | A1 | 9/2002 | Ghosh et al. |
| 2003/0031931 | A1 | 2/2003 | Obrovac et al. |
| 2003/0099884 | A1 | 5/2003 | Chiang et al. |
| 2003/0157409 | A1 | 8/2003 | Huang |
| 2004/0013941 | A1* | 1/2004 | Kobayashi ............ H01M 4/485 429/231.1 |
| 2004/0175618 | A1 | 9/2004 | Inoue et al. |
| 2006/0246355 | A1 | 11/2006 | Min et al. |
| 2007/0148545 | A1 | 6/2007 | Amine et al. |
| 2007/0160911 | A1 | 7/2007 | Senga et al. |
| 2008/0241698 | A1 | 10/2008 | Katoh |
| 2009/0226816 | A1 | 9/2009 | Yoshida et al. |
| 2010/0019194 | A1 | 1/2010 | Fujiwara et al. |
| 2011/0076570 | A1 | 3/2011 | Hama et al. |
| 2011/0162198 | A1* | 7/2011 | Kawamoto ......... H01M 4/0433 29/623.1 |
| 2011/0229765 | A1 | 9/2011 | Barker et al. |
| 2011/0259505 | A1 | 10/2011 | Lee et al. |
| 2011/0262816 | A1 | 10/2011 | Amatucci |
| 2011/0311875 | A1 | 12/2011 | Lee et al. |
| 2012/0015234 | A1 | 1/2012 | Iwaya et al. |
| 2012/0094185 | A1 | 4/2012 | Tsuchida et al. |
| 2012/0196186 | A1 | 8/2012 | Richard |
| 2012/0208062 | A1 | 8/2012 | Zhou et al. |
| 2012/0276459 | A1 | 11/2012 | Im et al. |
| 2013/0040208 | A1 | 2/2013 | Kanno et al. |
| 2013/0295451 | A1 | 11/2013 | Miki |
| 2014/0011100 | A1 | 1/2014 | Lee et al. |
| 2014/0141341 | A1 | 5/2014 | Ohtomo et al. |
| 2014/0170493 | A1 | 6/2014 | Holme et al. |
| 2014/0170504 | A1 | 6/2014 | Baek et al. |
| 2014/0193693 | A1 | 7/2014 | Hoshina et al. |
| 2014/0193695 | A1 | 7/2014 | Hoshina et al. |
| 2014/0197800 | A1 | 7/2014 | Nagase et al. |
| 2014/0363745 | A1 | 12/2014 | Hirayama |
| 2015/0017548 | A1 | 1/2015 | Kato et al. |
| 2015/0037687 | A1 | 2/2015 | Kanno et al. |
| 2015/0056496 | A1 | 2/2015 | Liang et al. |
| 2015/0118574 | A1 | 4/2015 | Visbal et al. |
| 2015/0243974 | A1 | 8/2015 | Holme et al. |
| 2016/0156065 | A1 | 6/2016 | Visco et al. |
| 2016/0164136 | A1 | 6/2016 | Higuchi et al. |
| 2016/0181585 | A1 | 6/2016 | Choi et al. |
| 2016/0190638 | A1 | 6/2016 | Sugiura et al. |
| 2016/0190640 | A1 | 6/2016 | Visco et al. |
| 2016/0211517 | A1 | 7/2016 | Beck et al. |

FOREIGN PATENT DOCUMENTS

| | | | |
|---|---|---|---|
| JP | 2013045683 | 3/2013 | |
| JP | WO 2013069083 A1 * | 5/2013 | ............. H01M 4/62 |
| JP | 2014241240 | 12/2014 | |
| KR | 20140095658 | 8/2014 | |
| WO | WO 2011/118801 | 9/2011 | |
| WO | WO 2014/132333 A1 | 9/2014 | |
| WO | WO2014186634 A2 | 11/2014 | |
| WO | WO 2015130831 A1 | 9/2015 | |

OTHER PUBLICATIONS

Desmond, K.W., et al. "Influence of Particle Size Distribution on Random Close Packing of Spheres" pp. 1-6.

Donev, Aleksander, et al. "Improving the Density of Jammed Disordered Packings Using Ellipsoids" Science, vol. 303, pp. 990-993.

Ebner, M., et al. "Tool for Tortuosity Estimation in Lithium Ion Battery Porous Electrodes", Journal of Electrochemical Society, 162(2), pp. A3064-A3070.

Farr, R.S., et al. "Close packing density of polydisperse hard spheres", The Journal of Chemical Physics, vol. 131, pp. 244104-1 to 244104-7.

Farrell, Greg R., et al. "Loose packings of frictional spheres", The Royal Society of Chemistry 2010, Soft Matter vol. 6., pp. 2925-2930.

Isichenko, M.B. "Percolation, statistical topography, and transport in random media", The American Physical Society, Reviews of Modern Physics, vol. 64, No. 4, pp. 961-1043.

Lubachevsky, Boris D., et al. "Geometric Properties of Random Disk Packings", Journal of Statistical Physics, vol. 60, Nos. 5/6, pp. 561-583.

Torquato, S., et al. "Is Random Close Packing of Spheres Well Defined ?", The American Physical Society, Physical Review Letters, pp. 2064-2067.

Xue, Qingzhong "The influence of particle shape and size on electric conductivity of metal-polymer composites", European Polymer Journal, pp. 323-327.

Zheng, Jingmin, et al., "Improved Equation of the Continuous Particle Size Distgributoin for Dense Packing", J. Am. Ceram. Soc., 73,[5], pp. 1392-1398.

McGrogan, Frank P. et al., Compliant Yet Brittle Mechanical Behavior of $Li_2S$—$P_2S_5$ Lithium-Ion-Conducting Solid Electrolyte (2017) *Adv. Energy Mater.* 1602011, 5 pages.

Qu, Meng et al., Nanomechanical Quantification of Elastic, Plastic, and Fracture Properties of $LiCoO_2$ (2012) *Adv. Energy Mater.* 2:940-944; 5 pages.

Sakuda, Atsushi et al., Evaluation of elastic modulus of $Li_2S$—$P_2S_5$ glassy solid electrolyte by ultrasonic sound velocity measurement and compression test (2013) *Journal of the Ceramic Society of Japan* 121[11]:946-949; 4 pages.

Sakuda, Atsushi et al., Sulfide Solid Electrolyte with Favorable Mechanical Property for All-Solid-State Lithium Battery (2013) *Scientific Reports* 3:2261 | DOI: 10.1038/srep02261, 5 pages.

Adams et al., "Structural requirements for fast lithium ion migration in $Li10GeP2S12$," J. Mater. Chem., 2012, vol. 22, pp. 7687-7691.

Ahn et al., "Synthesis and Lithium Conductivities of $Li_2SiS_3$ and $Li_4SiS_4$," Mat. Res. Bull., 1989, vol. 24, pp. 889-897.

Amaresh, S. et al., "Aluminum based sulfide solid lithium ionic conductors for all solid state batteries," Nanoscale, 2014, 6, pp. 6661-6667.

Andrews et al., "Infrared Spectra of P4S10 and its Decomposition Products in Solid Argon," Inorganic Chemistry, 1990, vol. 29, pp. 5222-5225.

(56) References Cited

OTHER PUBLICATIONS

Aotani, "Synthesis and electrochemical properties of lithium ion conductive glass, $Li_3PO_4$—$Li_2S$—$SiS_2$," Solid State Ionics, 1994, vol. 68, pp. 35-39.
Bandari, A. et al., "Origin of Fast Ion Conduction in Li10GeP2S12, a Superionic Conductor," J. Phys. Chem. C, 2016, 120, pp. 29002-29010.
Bartholomew et al., "Electrical properties of new glasses based on the $Li_2S$—$SiS_2$ system," Journal of Non-Crystalline Solids, 1999, vol. 256 & 257, pp. 242-247.
Bron, P. et al., "$Li_{10}Si_{0.3}Sn_{0.7}P_2S_{12}$—A low-cost and low-grain-boundary-resistance lithium supersonic conductor," Journal of Power Sources, 329, 2016, pp. 530-535.
Bron, P. et al., "$Li_{10}SnP_2S_{12}$: An Affordable Lithium Superionic Conductor," J. Am. Chem. Soc., 2013, 135, pp. 15694-15697.
Creus et al., "The Use of Ionic and Mixed Conductive Glasses in Microbatteries," Materials Science and Engineering, 1989, B3, pp. 109-112.
Creus et al., "Thin films of ionic and mixed conductive glasses: their use in microdevices," Solid State Ionics, 1992, vol. 53-56, pp. 641-646.
Deiseroth et al., "$Li_6PS_5X$: A Class of Crystalline Li. Rich Solids with an Unusually High Li+ Mobility," Angew. Chem. Int. Ed., 2008, vol. 47, pp. 755-758.
Duluard et al., "Lithium conducting solid electrolyte $LiI_3Al_{53}Ti_{17}(PO_4)_3$ obtained via solution chemistry," Journal of the European Ceramic Society, 2012, 9 pages.
Eckert et al., "Structural Transformation of Non-Oxide Chalcogenide Glasses. The Short-Range Order of $Li_2S$—$P_2S_5$ Glasses Studied by Quantitative 31P and 6,7Li High-Resolution Solid-State NMR," Chem. Mater., 1990, vol. 2, pp. 273-279.
Hassoun, J. et al., "A structural, spectroscopic and electrochemical study of a lithium ion conducting $Li_{10}GeP_2S_{12}$ solid electrolyte," Journal of Power Sources, 229, 2013, pp. 117-122.
Hayashi, Akitoshi, et al., "Characterization of $Li_2S$—$P_2S_5$ glass-ceramics as a solid electrolyte for lithium secondary batteries," Solid State Ionics, 2004, vol. 175, pp. 683-686.
Hayashi, Akitoshi, et al., "Characterization of $Li_2S$—$SiS_2$—$Li_3MO_3$ (M=B, Al, Ga and In) oxysulfide glasses and their application to solid state lithium secondary batteries," Solid State Ionics, 2002, vol. 152-153, pp. 285-290.
Hayashi, Akitoshi, et al., "Development of sulfide glass-ceramic electrolytes for all-solid-state lithium rechargeable batteries," J. Solid State Electrochem, 2010, vol. 14, pp. 1761-1767.
Hayashi, Akitoshi, et al., "Formation of Li. superionic crystals from the $Li_2S$—$P_2S_5$ melt-quenched glasses," J. Mater Sci, 2008, vol. 43, pp. 1885-1889.
Hayashi, Akitoshi, et al., "Formation of superionic crystals from mechanically milled $Li_2S$—$P_2S_5$ glasses," Electrochemistry Communications, 2003, vol. 5, pp. 111-114.
Hayashi, Akitoshi, et al., "Improvement of chemical stability of $Li_3PS_4$ glass electrolytes by adding MA (M=Fe, Zn, and Bi) nanoparticles," Journal of Materials Chemistry A, 2013, vol. 1, pp. 6320-6326.
Hayashi, Akitoshi, et al., "Preparation of $Li_2S$—$P_2S_5$ Amorphous Solid Electrolytes by Mechanical Milling," Journal of the American Ceramic Society, 2001, vol. 84, pp. 477-479.
Hirai, Koichi, et al., "Thermal and electrical properties of rapidly quenched glasses in the systems $Li_2S$—$SiS_2$—LixMOy (LixMOy=LL$_1$Sial, $Li_2SO_4$)," Solid State Ionics, 1995, vol. 78, pp. 269-273.
Hu et al., "Ionic Conductivity of Lithium Orthosilicate-Lithium Phosphate Solid Solutions," J. Electrochem. Soc., 1977, vol. 124, No. 8, pp. 1240-1242.
Inada, T. et al., "All solid-state sheet battery using lithium Inorganic solid electrolyte, thio-LISICON," Journal of Power Sources, 194, 2009, pp. 1085-1088.
Inada, T. et al., "Fabrications and properties of composite solid-state electrolytes," Solid State Ionics, 158, 2003, pp. 275-280.

Inada, T. et al., "Silicone as a binder in composite electrolytes," Journal of Power Sources, 119-121, 2003, pp. 948-950.
International Preliminary Report on Patentability of PCT/US2015/033027 dated Dec. 15, 2016, 15 pages.
International search report and written opinion of PCT/US2015/033027 dated Aug. 14, 2015, 16 pages.
Kaib, Thomas, et al., "New Lithium Chalcogenidotetrelates, LiChT: Synthesis and Characterization of the LitConducting Tetralithium ortho-Sulfidostannate $Li_4SnS_4$," Chemistry of Materials, 2012, vol. 24, pp. 2211-2219.
Kamaya, Noriaki, et al., "A lithium superionic conductor," Nature Materials, 2011, vol. 10, pp. 682-686.
Kamaya, Noriaki, et al., "A lithium superionic conductor," *Supporting Information Nature Materials*, 2011, vol. 10, pp. 682-686.
Kanno, R. et al., "New Lithium Solid Electrolytes, Thio-Lisicon: Materials Design Concept and Application to Solid State Battery," Solid State Ionics: Trends in the New Millennium, Dec. 7, 2002, pp. 13-22.
Kanno, Ryoji, "Lithium Ionic Conductor Thio-LISICON, the $Li_2S$—$GeS_2$—$P_2S_5$ System," Journal of the Electrochemical Society, 2001, vol. 148, pp. A742-A746.
Kanno, Ryoji, "Synthesis of a new lithium Ionic conductor, thio-LISICON-lithium germanium sulfide system," Solid State Ionics, 2000, vol. 130, pp. 97-104.
Kato, Y. et al., "Discharge Performance of All-Solid-State Battery Using a Lithium Superionic Conductor $Li_{10}GeP_2S_{12}$," Electrochemistry, vol. 80, 2012, No. 10, pp. 749-751.
Kato, Y. et al., "Synthesis, structure and lithium ionic conductivity of solid solutions of $Li_{10}(Ge_{1-x}M_x)P_2S_{12}$ (M=Si, Sn)," Journal of Power Sources, 271, 2014, pp. 60-64.
Kennedy, John, H., et al., "A Highly Conductive Li.-Glass System: (1-x) (0.45i52-0.6Li2S)-xLI1," J. Electrochem. Soc., 1986, pp. 2437-2438.
Kobayashi, Takeshi, et al., "Interfacial reactions at electrode/electrolyte boundary in all solid-state lithium battery using inorganic solid electrolyte, thio-LISICON," Electrochimica Acta, 2008, vol. 53, pp. 5045-5050.
Kondo et al., "New lithium ion conductors based on $Li_2S$—$SiS_2$ system," Solid State Ionics, 1992, vol. 53-56, pp. 1183-1186.
Kuhn, A. et al., "A new ultrafast superionic Li-conductor: ion dynamics in $Li_{11}Si_2PS_{12}$ and comparison with other tetragonal LGPS-type electrolytes," Phys. Chem. Chem. Phys., 2014, 16, pp. 14669-14874.
Kuhn, A. et al., "Single-crystal X-ray structure analysis of the superionic conductor $Li_{10}GeP_2S_{12}$," Phys.Chem. Chem. Phys., 2013, 15, 11620-11622.
Kuhn, A. et al., "Tetragonal $Li_{10}GeP_2S_{12}$ and $Li_7GePS_8$—exploring the Li ion dynamics in LGPS Li electrolytes," Energy Environ. Sci., 2013, 6, pp. 3548-3552.
Kuhn, A. et al., "Ultrafast Li Electrolytes Based on Abundant Elements: $Li_{10}SnP_2S_{12}$ and $Li_{11}Si_2PS_{12}$," *Supporting Information*, Feb. 19, 2014: arXiv: 1402.4586.
Kuhn, A. et al., "Ultrafast Li Electrolytes Based on Abundant Elements: $Li_{10}SnP_2S_{12}$ and $Li_{11}Si_2PS_{12}$," Feb. 19, 2014: arXiv. 1402.4586.
Leal-Gonzalez et al., "Structure of Lithium Sulfide, $LiGaS_2$," Acta. Cryst., 1990, pp. 2017-2019.
Liu et al. "Anomalous High Iconic Conductivity of Nanoporous R—$Li_3PS_4$," Journal of the American Chemical Society, 2012, 4 pages.
Liu et al., "High performance $Li_2S$—$P_2S_5$ solid electrolyte induced by selenide," Journal of Power Sources, 2014, vol. 260, pp. 264-267.
Menetrier et al., "Iconic conduction in $B_2S_3$—$Li_2S$—LiI glasses," Solid State Ionics, 1992, vol. 53-56, pp. 1208-1213.
Mercier et al., "Superionic Conduction in $Li_2S$—$P_2S_5$—Li1-Glasses," Solid State Ionics, 1981, vol. 5, pp. 663-666.
Minami Tsutomu, "Fast Ion Conducting Glasses," Journal of Non-Crystalline Solids, 1985, vol. 73, pp. 273-284.
Minami, Keiichi, et al., "Electrical and electrochemical properties of the $70Li_2S$ $(30-x)P_2S_5xP_2O_5$ glass-ceramic electrolytes," Solid State Ionics, 2008, vol. 179, pp. 1282-1285.

(56) References Cited

OTHER PUBLICATIONS

Minami, Keiichi, et al., "Electrical and electrochemical properties of glass-ceramic electrolytes in the systems $Li_2S$—$P_2S_5$—$P_2S_3$ and $Li_2S$—$P_2S_5$—$P_2O_5$," Solid State Ionics, 2011, vol. 192, pp. 122-125.
Minami, Keiichi, et al., "Lithium ion conductivity of the $Li_2S$—$P_2S_5$glass-based electrolytes prepared by the melt quenching method," Solid State Ionics, 2007, vol. 178, pp. 837-841.
Minami, Tsutomu, et al., "Preparation and characterization of lithium ion-conducting oxysulfide glasses," Solid State Ionics, 2000, vol. 136-137, pp. 1015-1023.
Minami, Tsutomu, et al., "Recent progress of glass and glass-ceramics as solid electrolytes for lithium secondary batteries," Solid State Ionics, 2006, vol. 177, pp. 2715-2720.
Mizuno et al., "All Solid-State Lithium Secondary Batteries Using High Lithium Ion Conducting $Li_2S$—$P_2S_5$ Glass-Ceramics," Chemistry Letters, 2002, pp. 1244-1245.
Mizuno et al., "High lithium ion conducting glass-ceramics in the system $Li_2S$—$P_2S_5$," Solid State Ionics, 2006, vol. 177, pp. 2721-2725.
Mizuno, Fuminori, et al., "New, Highly Ion-Conductive Crystals Precipitated from $Li_2S$—$P_2S_5$ Glasses," Advanced Materials, 2005, vol. 17, No. 7, pp. 918-921.
Mo, Y. et al., "First Principles Study of the $Li_{10}GeP_2S_{12}$ Lithium Super Ionic Conductor Material," Chem. Mater., 2012, 24, pp. 15-17.
Morimoto, Hideyuki, et al., "Mechanochemical Synthesis of New Amorphous Materials of $60Li_2$—$40SiS_2$ with High Lithium Ion Conductivity," J. Am. Ceram. Soc., 1999, vol. 82, pp. 1352-1354.
Muller et al. Highly Conducting Nanosized Monodispersed Antimony-Doped Tin Oxide Particles Synthesized via Nonaqueous Sol-Gel Method. NSTI-Nanotech. 1:340-343, 2010. [retrieved on Jul. 23, 2015]. Retrieved from the Internet. <URL: http://www.researchgate.net/publication/40631712_Highly_Conducting_Nanosized_Monodispersed_AntimonyLDoped_Tin_Oxide_Particles_Synthesized_via_Nonaqueous_Sol-Gel_Procedure>, Entire document.
Muramatsu, Hiromasa, et al., "Structural change of Li2S—P2S5 sulfide solid electrolytes in the atmosphere," Solid State Ionics, 2011, vol. 182, pp. 116-119.
Murayama et al., "Synthesis of New Lithium Ionic Conductor Thio-LISICON-Lithium Silicon Sulfides System," Journal of Solid State Chemistry, 2002, vol. 168, pp. 140-148.
Murayama, Masahiro, et al., "Material Design of New Lithium Ionic Conductor thio-LISICON, in the $Li_2S$—$P_2S_5$ System," Solid State Ionics, 2004, vol. 170, pp. 173-180.
Norrel et al., "Anion exchange of Oxygen by Sulfur in GeO2-based glasses," Proceedings of SPIE, vol. 4990, 2003, pp. 87-96.
Oh, G. et al., "Bulk-Type All Solid-State Batteries with 5 V Class LiNi0.5Mn1.5O4 Cathode and Li10GeP2S12 Solid Electrolyte," Chem. Mater., 2016, 28, pp. 2634-2640.
Ohtomo et al., "Characteristics of the $Li_2O$—$Li_2S$—$P_2S_5$glasses synthesized by the two-step mechanical milling," Journal of Non-Crystalline Solids, 2013, vol. 364, pp. 57-61.
Ohtomo et al., "Electrical and electrochemical properties of $Li_2S$—$P_2S_5$—$P_2O_5$ glass-ceramic electrolytes," Journal of Power Sources, 2005, vol. 146, pp. 715-718.
Ohtomo, Takamasa, et al., "Suppression of H2S gas from $Li_2S$—$P_2S_5$glass electrolytes by the addition of $Li_2O$," The Electrochemical Society, 2012, 1 page.
Ong, S. et al., "Phase stability, electrochemical stability and ionic conductivity of the Li10±1MP2X12 (M=Ge, Si, Sn, Al or P, and X=O, S or Se) family of superionic conductors," Energy Environ. Sci., 2013, 6, pp. 148-156.
Ooura et al., "A new lithium-ion conducting glass ceramic in the composition of 75Li2S 5P2S3 20P2S5 (mork)," Solid State Ionics, 2013, 5 pages.
Pradel et al., "Ionically Conductive Chalcogenide Glasses," Journal of Solid State Chemistry, 1992, vol. 96, pp. 247-257.
Pradel et al., "Lithium Chalcogenide Conductive Glasses," Materials Chemistry and Physics, 1989, vol. 23, pp. 121-142.
Rao et al., "Synthesis and Li. ion Migration Studies of $Li_8PS_xX$ (X=Cl, Br, I)," Mater. Res. Soc. Symp. Proc., 2011, vol. 1331, 6 pages.
Sahu et al., "Air-Stable, High-Conduction Solid Electrolytes of Arsenic-Substituted $Li_4SnS_4$," Energy Environ. Sci., 2013, 9 pages.
Sakuda et al., "All-solid-state lithium secondary batteries using LiCoO2 particles with pulsed laser deposition coatings of $Li_2S$—$P_2S_5$ solid electrolytes," Journal of Power Sources, 2011, vol. 196, pp. 6735-6741.
Sakuda et al., "Sulfide Solid Electrolyte with Favorable Mechanical Property for All-Solid-State Lithium Battery," Scientific Reports, 2013, 5 pages.
Seino et al., "A sulphide lithium super ion conductor is superior to liquid ion conductors for use in rechargeable batteries," Energy & Environmental Science, 2013, 5 pages.
Seino et al., "Synthesis and electrochemical properties of $Li_2S$—$B_2S_3$—$LL_1SiO_4$," Solid State Ionics, 2006, vol. 177, pp. 2601-2603.
Seino et al., "Synthesis of phosphorous sulfide solid electrolyte and all-solid-state lithium batteries with graphite electrode," Solid State Ionics, 2005, pp. 2389-2393.
Seino et al., Electronic Supplementary Material (ESI) to "A sulphide lithium super ion conductor is superior to liquid ion conductors for use in rechargeable batteries," Energy & Environmental Science, 2013, 4 pages.
Seo et al., "Fast lithium ion conducting solid state thin-film electrolytes based on lithium thio-germanate materials," Acta Materialia, 2011, vol. 59, pp. 1839-1846.
Seo et al., "Structural Properties of Lithium Thio-Germanate Thin Film Electrolytes Grown by Radio Frequency Sputtering," Inorganic Chemistry, 2011, vol. 50, pp. 2143-2150.
Sistla et al., "Structural studies on $xLi_2S$—$(1-x)P_2S_5$ glasses by X-ray diffraction and molecular dynamics simulation," Journal of Non-Crystalline Solids, 2004, vol. 349, pp. 54-59.
Sun, Y. et al., "Oxygen substitution effects in $Li_{10}GeP_2S_{12}$ solid electrolyte," Journal of Power Sources, 324, 2016, pp. 798-803.
Suzuki, K. et al., "Synthesis, structure, and electrochemical properties of crystalline Li—P—S—O solid electrolytes: Novel lithium-conducting oxysulfides of $Li_{10}GeP_2S_{12}$ family," Solid State Ionics, vol. 288, May 2016, pp. 229-234.
Sveinbjornsson et al., "Ionic Conductivity and the Formation of Cubic $CaH_2$ in the $LiBH_4$—$Ca(BH_4)_2$ Composit," Journal of Solid State Chemistry, 2013, 26 pages.
Tachez et al., "Ionic Conductivity of and Phase Transition in Lithium Thiophosphate $Li_3PS_4$," Solid State Ionics, 1984, vol. 14, pp. 181-185.
Takada et al., "Electrochemical behaviors of Li. ion conductor $Li_3PO_4$—$Li_2S$—$SiS_2$," Journal of Power Sources, 1993, vol. 43-44, pp. 135-141.
Takada et al., "Lithium ion conductive oxysulfide $Li_3PO_4$—$Li_3PS_4$," Solid State Ionics, 2005, vol. 176, pp. 2355-2359.
Takada et al., "Solid State Lithium Battery with Oxysulfide glass", Solid State Ionics, 1996, vol. 86-88, pp. 877-882.
Takahara et al., Application of Lithium Metal Electrodes to All-Solid-State Lithium Secondary Batteries Using $Li_3PO_4$—$Li_2S$—$SiS_2$ glass, Journal of the Electrochemical Society, 2004, vol. 151, Issue 9, pp. A1309-A1313.
Tarhouchi, I. et al., "Electrochemical characterization of Li10SnP2S12: An electrolyte or a negative electrode for solid state Li-ion batteries?" Solid State Ionics, 296, 2016, pp. 18-25.
Tatsumisago et al., "All-solid-state lithium secondary batteries using sulfide-based glass-ceramic electrolytes," Journal of Power Sources, 2006, vol. 159, pp. 193-199.
Teragawa, Shingo, et al., "Preparation of $Li_2S$—$P_2S_5$ solid electrolyte from N-methylformamide solution and application for all-solid-state lithium battery," Journal of Power Sources, 2014, vol. 248, pp. 939-942.
Trevey et al., "Glass-ceramic $Li_2S$—$P_2S_5$ electrolytes prepared by a single step ball billing process and their application for all-solid-state lithium-ion batteries," Electrochemistry Communications, 2009, vol. 11, pp. 1830-1833.
Ujiie et al., "Preparation and electrochemical characterization of $(100-x)(0.7Li_2S\ 0.3P_2S_5)\ xLiBr$ glass-ceramic electrolytes," Mater Renew Systain Energy, 2013, 8 pages.

(56) References Cited

OTHER PUBLICATIONS

Wang, Y. et al., "Highly lithium-ion conductive thio-LISICON thin film processed by low-temperature solution method," *Supporting Information*, Journal of Power Sources, 224, 2013, pp. 225-229.
Wang, Y. et al., "Highly lithium-ion conductive thio-LISICON thin film processed by low-temperature solution method," Journal of Power Sources, 224, 2013, pp. 225-229.
Weber, Dominik A. et al., "Structural Insights and 3D Diffusion Pathways within the Lithium Superionic Conductor Li10GeP2S12," Chem. Mater., 2016, 28, pp. 5905-5915.
Wenzel, S. et al., "Direct Observation of the Interfacial Instability of the Fast Ionic Conductor $Li_{10}GeP_2S_{12}$ at the Lithium Metal Anode," Chem. Mater., 2016, 28, pp. 2400-2407.
Xu, M. et al., "One-dimensional stringlike cooperative migration of lithium ions in an ultrafast ionic conductor," Appl. Phys. Lett. 101, 2012, 031901.
Yamashita et al., "Formation and ionic conductivity of $Li_2S$—$GeS_2$—$Ga_2S_3$ glasses and thin films," Solid State Ionics, 2003, vol. 158, pp. 151-156.
Yamauchi et al., "Preparation and ionic conductivities of $(100-x)(0.75Li_2S0.25P_2S_5)xLiBH_4$ glass electrolytes," Journal of Power Sources.
The Extended European Search Report of EP Patent Application No. 15802579.1 dated Sep. 25, 2017, 13 pages.
"A Basic Guide to Particle Characterization Inform White Paper 2 A Basic Guide to Particle Characterization A Basic Guide to Particle Characterization 1 Introduction 3", May 2, 2012, XP055089322, Retrieved from the Internet: URL:http://golik.co.il/Data/ABasicGuidtoParticleCharacterization(2)__1962085150.pdf [retrieved on Nov. 20, 2013]., 26 pages.

\* cited by examiner

US 9,859,560 B2

ELECTRODE MATERIALS WITH MIXED PARTICLE SIZES

CROSS-REFERENCES TO RELATED APPLICATIONS

This application claims priority to U.S. Provisional Patent Application No. 62/007,416, filed Jun. 4, 2014, entitled ELECTRODE MATERIALS WITH MIXED PARTICLE SIZES, the contents of which are incorporated by reference herein for all purposes in their entirety.

BACKGROUND OF THE INVENTION

The instant disclosure is directed to electrochemical devices and materials therefor. In particular, the instant disclosure addresses some of the challenges related to electrochemical electrode fabrication and electrode packing architectures for nanodimensioned and/or solid state electrodes.

As the prevalence of consumer electronics (e.g., mobile phones, tablets, and laptop computers) and electrified vehicles (e.g., plug-in hybrids and BEVs) has increased, so too has the demand for better performing energy storage devices which are required to power these electronics and vehicles. While rechargeable (secondary/traction) lithium (Li) ion batteries (i.e., Li-rechargeable batteries) are popular for consumer electronics, conventional batteries are still too limited with respect to energy density and power output for widespread adoption in other applications (e.g., automotive). Solid state Li-rechargeable batteries, which consist of all solid state components, have higher theoretical energy density and power properties and are therefore attractive alternatives to conventional batteries, which rely on and include liquid electrolytes.

Ionic conductivity is typically lower in solids than in liquids. Therefore, to achieve high power outputs in a solid state battery, in which all ion conduction pathways are through solids, the ion pathways should be reduced and the intrinsic ionic conductivity of the constituent solids should be increased. Despite substantial efforts, these problems have not been remedied and solid state batteries still suffer from low power output.

There is therefore a series of problems in the relevant field related to solid state electrochemical electrodes (e.g., thin film positive electrodes) and the manner in which to nanostructure and nano-order the constituent components (e.g., active material and catholyte). What is needed in the relevant field is, for example, methods for making new thin film positive electrodes that include particularly sized features required for high performance solid state batteries. The instant disclosure sets forth, in part and for example, such nanostructured and nano-ordered positive electrodes in addition to making and using the same, and other solutions to problems in the relevant field.

BRIEF SUMMARY OF THE INVENTION

In one embodiment, set forth herein are solid state electrochemical electrodes which include a first plurality of particles of electrochemically active material, the first particles having a first particle size distribution characterized by a first dispersity of 0.25 or less and a first median diameter; and a second plurality of particles of ion conductive material, the second particles having a second particle size distribution characterized by a second dispersity of 0.25 or less and a second median diameter, the second median diameter being at least three times smaller than the first median diameter.

In a second embodiment, set forth herein are solid state electrochemical electrodes which include active materials characterized by a first particle size distribution having a first median particle size; catholyte materials characterized by a second particle size distribution having a second median particle size; wherein the volumetric ratio of active materials to catholyte materials is from 99:1 to 1:1; and wherein the particle size ratio of the first median particle size to the second median particle size is at least 3:1 or greater.

In a third embodiment, set forth herein are electrochemical cells which include an anode current collector; an anode in direct contact with the anode current collector; an electrolyte in direct contact with the anode, the anode being positioned between the anode current collector and the electrolyte, and the electrolyte being characterized by an ionic conductivity of at least 1e-4 S/cm; and a solid state positive electrode in direct contact with the electrolyte and including active materials characterized by a first particle size distribution having a first median particle size; catholyte materials characterized by a second particle size distribution having a second median particle size; wherein the volumetric ratio of active materials to catholyte materials is from 99:1 to 1:1; wherein the particle size ratio of the first median particle size to the second median particle size is at least 3:1 or greater.

In fourth and fifth embodiments, set forth herein are methods for making and using the aforementioned electrochemical electrodes.

DETAILED DESCRIPTION OF THE INVENTION

Figure 1:
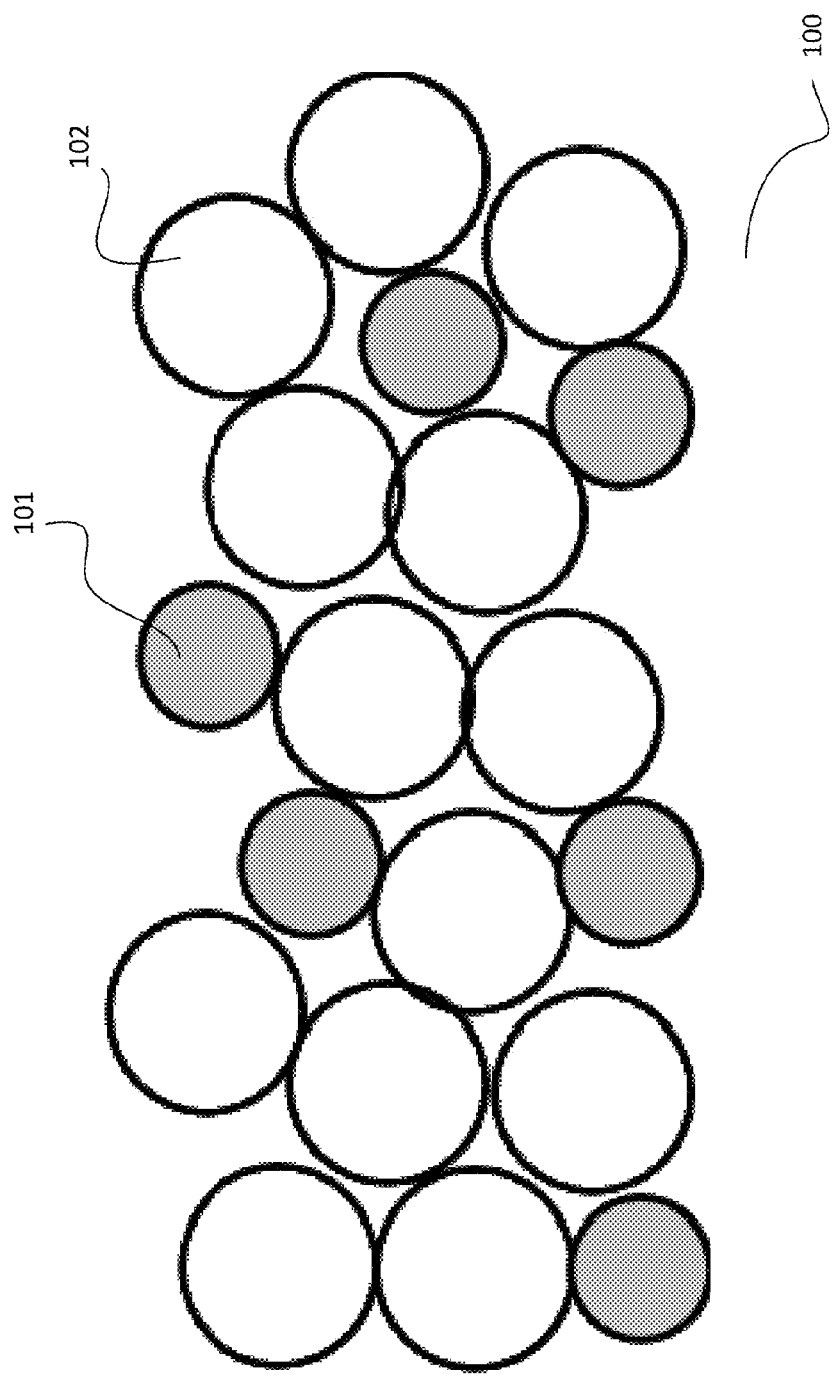
FIG. 1 shows an example electrode having mixed sized particles of active materials and catholyte.

The following description is presented to enable one of ordinary skill in the art to make and use the examples and embodiments set forth herein and to incorporate the same in the context of particular applications. Various modifications, as well as a variety of uses in different applications will be readily apparent to those skilled in the art, and the general principles defined herein may be applied to a wide range of embodiments. Thus, the instant disclosure is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. Unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. §112(f). In particular, the use of "step of" or "act of" in the claims herein is not intended to invoke the provisions of 35 U.S.C. 112 §112(f).

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. Definitions

As used herein, the phrase "at least one member selected from the group," includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any other all combinations of A, B, and C.

As used herein, the phrase "electrochemical cell," refers to, for example, a "battery cell" and includes a positive electrode, a negative electrode, and an electrolyte therebetween and in direct contact therewith which conducts ions (e.g., $Li^+$) but electrically insulates the positive and negative electrodes. In some embodiments, a battery may include multiple positive electrodes and/or multiple negative electrodes enclosed in one container.

As used herein, the phrase "positive electrode," refers to the electrode in a secondary battery towards which positive ions, e.g., $Li^+$, conduct, flow or move during discharge of the battery. As used herein, the phrase "negative electrode" refers to the electrode in a secondary battery from where positive ions, e.g., Li$^+$, flow or move during discharge of the battery. In a battery comprised of a Li-metal electrode and a conversion chemistry electrode (i.e., active material; e.g., NiF$_x$), the electrode having the conversion chemistry materials is referred to as the positive electrode. In some common usages, cathode is used in place of positive electrode, and anode is used in place of negative electrode. When a Li-secondary battery is charged, Li ions move from the positive electrode (e.g., NiF$_x$) towards the negative electrode (e.g., Li-metal). When a Li-secondary battery is discharged, Li ions move towards the positive electrode and from the negative electrode.

As used herein, the phrase "sulfide electrolyte," refers to an inorganic solid state material that conducts Li$^+$ ions but is substantially electronically insulating. Some sulfide electrolytes set forth herein include lithium, phosphorus, and sulfur and optionally one, two, or three additional elements. Some of these sulfide electrolytes are referred to herein as LXPS materials wherein, L refers to lithium, P refers to phosphorus, and S refers to sulfur, and X refers to the optional one, two or three additional elements. Example LXPS materials are found, for example, in International PCT Patent Application No. PCT/US14/38283, filed May 15, 2014, and entitled SOLID STATE CATHOLYTE OR ELECTROLYTE FOR BATTERY USING Li$_4$MP$_B$S$_C$ (M=Si, Ge, AND/OR Sn); also, U.S. Pat. No. 8,697,292 to Kanno, et al., the entire contents of both of which are incorporated by reference in their entirety for all purposes.

As used here, the phrase "sulfide electrolyte," includes, but is not limited to, LSS, LTS, LXPS, LXPSO, where X is Si, Ge, Sn, As, Al; LATS; and S is S, Si, or combinations thereof; T is Sn.

As used here, "LXPS" refers to a catholyte material characterized by the formula Li$_a$MP$_b$S$_c$, where M is Si, Ge, Sn, and/or Al, and where 2 ≤a ≤8, 0.5 ≤b ≤2.5, 4 ≤c ≤12. "LSPS" refers to an electrolyte material characterized by the formula L$_a$SiP$_b$S$_c$, where 2 ≤a ≤8, 0.5 ≤b ≤2.5, 4 ≤c ≤12. LSPS refers to an electrolyte material characterized by the formula L$_a$SiP$_b$S$_c$, wherein, where 2 ≤a ≤8, 0.5 ≤b ≤2.5, 4 ≤c ≤12, d ≤3. Exemplary LXPS materials are found, for example, in International Patent Application No. PCT/US2014/038283, filed May 15, 2014, and entitled SOLID STATE CATHOLYTE OR ELECTROLYTE FOR BATTERY USING Li$_4$MP$_B$Sc (M=Si, Ge, AND/OR Sn), which is incorporated by reference herein in its entirety. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, 0 present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula Li$_a$MP$_b$S$_c$O$_d$, where M is Si, Ge, Sn, and/or Al, and where 2 ≤a ≤8, 0.5 ≤b ≤2.5, 4 ≤c ≤12, d <3. LXPSO refers to LXPS, as defined above, and having oxygen doping at from 0.1 to about 10 atomic %. LPSO refers to LPS, as defined above, and having oxygen doping at from 0.1 to about 10 atomic %.

As used here, "LSS" refers to lithium silicon sulfide which can be described as Li$_2$S—SiS$_2$, Li—SiS$_2$, Li—S—Si, and/or a catholyte consisting essentially of Li, S, and Si. LSS refers to an electrolyte material characterized by the formula Li$_x$Si$_y$S$_z$ where 0.33≤x≤0.5, 0.1≤y≤0.2, 0.4≤z≤0.55, and it may include up to 10 atomic % oxygen. LSS also refers to an electrolyte material comprising Li, Si, and S. In some examples, LSS is a mixture of Li$_2$S and SiS$_2$. In some examples, the ratio of Li$_2$S:SiS$_2$ is 90:10, 85:15, 80:20, 75:25, 70:30, 2:1, 65:35, 60:40, 55:45, or 50:50 molar ratio. LSS may be doped with compounds such as Li$_x$PO$_y$, Li$_x$BO$_y$, Li$_4$SiO$_4$, Li$_3$MO$_4$, Li$_3$MO$_3$, PS$_x$, and/or lithium halides such as, but not limited to, LiI, LiCl, LiF, or LiBr, wherein 0<x≤5 and 0<y≤5.

As used here, "LTS" refers to a lithium tin sulfide compound which can be described as Li$_2$S—SnS$_2$, Li$_2$S—SnS, Li—S—Sn, and/or a catholyte consisting essentially of Li, S, and Sn. The composition may be Li$_x$Sn$_y$S$_z$ where 0.25≤x≤0.65, 0.05≤y≤0.2, and 0.25≤z≤0.65. In some examples, LTS is a mixture of Li$_2$S and SnS$_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In. As used herein, "LATS" refers to LTS, as used above, and further comprising Arsenic (As). In LATS, L refers to lithium, A refers to arsenic, T refers to tin, and S refers to sulfur.

As used here, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula Li$_x$P$_y$S$_z$ where 0.33≤x≤0.67, 0.07≤y≤0.2 and 0.4≤z≤0.55. LPS also refers to an electrolyte characterized by a product formed from a mixture of Li$_2$S:P$_2$S$_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of Li$_2$S:P$_2$S$_5$ wherein the reactant or precursor amount of Li$_2$S is 95 atomic % and P$_2$S$_5$ is 5 atomic %. LPS also refers to an electrolyte characterized by a product formed from a mixture of Li$_2$S:P$_2$S$_5$ wherein the reactant or precursor amount of Li$_2$S is 90 atomic % and P$_2$S$_5$ is 10 atomic %. LPS also refers to an electrolyte characterized by a product formed from a mixture of Li$_2$S:P$_2$S$_5$ wherein the reactant or precursor amount of Li$_2$S is 85 atomic % and P$_2$S$_5$ is 15 atomic %. LPS also refers to an electrolyte characterized by a product formed from a mixture of Li$_2$S:P$_2$S$_5$ wherein the reactant or precursor amount of Li$_2$S is 80 atomic % and P$_2$S$_5$ is 20 atomic %. LPS also refers to an electrolyte characterized by a product formed from a mixture of Li$_2$S:P$_2$S$_5$ wherein the reactant or precursor amount of Li$_2$S is 75 atomic % and P$_2$S$_5$ is 25 atomic %. LPS also refers to an electrolyte characterized by a product formed from a mixture of Li$_2$S:P$_2$S$_5$ wherein the reactant or precursor amount of Li$_2$S is 70 atomic % and P$_2$S$_5$ is 30 atomic %. LPS also refers to an electrolyte characterized by a product formed from a mixture of Li$_2$S:P$_2$S$_5$ wherein the reactant or precursor amount of Li$_2$S is 65 atomic % and P$_2$S$_5$ is 35 atomic %. LPS also refers to an electrolyte characterized by a product formed from a mixture of Li$_2$S:P$_2$S$_5$ wherein the reactant or precursor amount of Li$_2$S is 60 atomic % and P$_2$S$_5$ is 40 atomic %.

As used here, LPSO includes the above description and an electrolyte material characterized by the formula Li$_x$P$_y$S$_z$O$_w$ where 0.33≤x≤0.67, 0.07≤y≤0.2, 0.4≤z≤0.55, 0≤w≤0.15. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used here, the term "necked," refers to a particle to particle connectivity for particles in, for example, a solid solution, a polymer, a solid matrix, or a solvent matrix. As necked electrolyte particles, these particle are in sufficient contact so as to provide an ion conduction pathway, from particle to particle and through the particles, by way of the particle to particle contacts or shared surfaces. Necked can include particles that are sintered together, face sharing, edge sharing, corner sharing, or otherwise bonded together and which form a percolation network when composited with a polymer, solvent, or other solid components.

As used here, the term "dispersity" refers to the breadth of a particle size distribution when measured by a standard technique such as dynamic light scattering. Mathematically, the particle distribution is approximately log-normal $$\left(P(x) = \frac{1}{x\sigma\sqrt{2\pi}} \exp\left[-\frac{(\ln(x) - \mu)^2}{2\sigma^2}\right]\right),$$

in which case the dispersity of the distribution is σ. A measure of dispersity expressed in numerical terms in this application refers to the dispersity of best fit log normal distribution to the experimentally measured particle size distribution. A dispersity value (σ) can be calculated using the formula above.

As used here, the phrase "sulfide based electrolytes," refers to electrolytes that include inorganic materials containing S which conduct ions (e.g., Li$^+$) and which are suitable for electrically insulating the positive and negative electrodes of an electrochemical cell (e.g., secondary battery). Example sulfide based electrolytes are described above, e.g., LXPS, LSTPS, LPSO, and related sulfides. Exemplary sulfide based electrolytes are set forth in International Patent Application PCT Patent Application No. PCT/US14/38283, SOLID STATE CATHOLYTE OR ELECTROLYTE FOR BATTERY USING LI$_A$MP$_B$S$_C$ (M=SI, GE, AND/OR SN), filed May 15, 2014, and published as WO 2014/186634, on Nov. 20, 2014.

As used herein, the phrase "solid state catholyte," or the term "catholyte" refers to an ion conductor that is intimately mixed with, or surrounded by, a cathode (i.e., positive electrode) active material (e.g., a metal fluoride optionally including lithium, a lithium cobalt oxide, or a lithium manganese cobalt oxide, or a lithium nickel aluminum cobalt oxide).

As used herein, the term "nanostructured," or "nanodimensioned" refers to a composite material wherein the constituent components are separated by nanodimensions. For example, a nanodimensioned composite material may include a Li-containing compound, e.g., LiF, and an Fe-containing compound, e.g., Fe, wherein the domains of Fe and the domains of LiF have median physical dimensions of about 1-100 nm, or 2-50 nm, or 1-10 nm, or 2-5 nm, or 5-15 nm, or 5-20 nm, or the like as measured in a TEM micrograph by identification of regions of visual contrast of different nanodomains.

As used herein, the term "electrolyte," refers to an ionically conductive and electrically insulating material. Electrolytes are useful for electrically insulating the positive and negative electrodes of a secondary battery while allowing for the conduction of ions, e.g., Li$^+$, through the electrolyte.

As used herein, the term "anolyte," refers to an ionically conductive material that is mixed with, or layered upon, or laminated to, an anode material or anode current collector.

As used herein, the phrase "green film" refers to an unsintered film including at least one member selected from garnet materials, precursors to garnet materials, binder, solvent, carbon, dispersant, or combinations thereof.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein the phrase "energy storage electrode," refers to, for example, an electrode that is suitable for use in an energy storage device, e.g., a lithium rechargeable battery or Li-secondary battery. As used herein, such an electrode is capable of conducting electrons and Li ions as necessary for the charging and discharging of a rechargeable battery.

As used herein, the phrase "providing" refers to the provision of, generation or, presentation of, or delivery of that which is provided.

As used herein the phrase "conductive additive," refers to a material that is mixed with the cathode active material in order to improve the conductivity of the cathode. Examples includes, but are not limited to, carbon and the various forms of carbon, e.g., ketjen black, VGCF, acetylene black, graphite, graphene, nanotubes, nanofibers, the like, and combinations thereof.

As used herein the phrase "applying a pressure," refers to a process whereby an external device, e.g., a calendar or uniaxial press, induces a pressure in another material.

As used herein the term "about," refers to a qualification of a number associated with the word about. About includes, in some examples, a range ±5-10% around the number qualified by the word about. For example, evaporating a solvent at about 80° C. includes evaporating a solvent at 79° C., 80° C., or 81° C.

As used here, the phrase "lithium-stuffed garnet electrolyte," refers to oxides that are characterized by a crystal structure related to a garnet crystal structure. Lithium-stuffed garnets include compounds having the formula Li$_A$La$_B$M'$_C$M''$_D$Zr$_E$O$_F$, Li$_A$La$_B$M'$_C$M''$_D$Ta$_E$O$_F$, or Li$_A$La$_B$M'$_C$M''$_D$Nb$_E$O$_F$, wherein 4<A<8.5, 1.5<B<4, 0≤C≤2, 0≤D≤2; 0≤E<2, 10<F<13, and M' and M'' are each, independently in each instance selected from Al, Mo, W, Nb, Sb, Ca, Ba, Sr, Ce, Hf, Rb, or Ta, or Li$_a$La$_b$Zr$_c$Al$_d$Me''$_e$O$_f$, wherein 5<a<7.7; 2<b<4; 0<c≤2.5; 0≤d<2; 0≤e<2, 10<f<13 and Me'' is a metal selected from Nb, Ta, V, W, Mo, or Sb and as described herein. Garnets, as used herein, also include those garnets described above that are doped with Al$_2$O$_3$. Garnets, as used herein, also include those garnets described above that are doped so that Al$^{3+}$ substitutes for Li$^+$. As used herein, lithium-stuffed garnets, and garnets, generally, include, but are not limited to, Li$_{7.0}$La$_3$(Zr$_{t1}$+Nb$_{t2}$+Ta$_{t3}$)O$_{12}$+0.35Al$_2$O$_3$; wherein (t1+t2+t3=subscript 2) so that the La:(Zr/Nb/Ta) ratio is 3:2. Also, garnet used herein includes, but is not limited to, $Li_xLa_3Zr_2O_{12}+yAl_2O_3$, wherein x ranges from 5.5 to 9; and y ranges from 0 to 1. In some examples x is 7 and y is 1.0. In some examples x is 7 and y is 0.35. In some examples x is 7 and y is 0.7. In some examples x is 7 and y is 0.4. Also, garnets as used herein include, but are not limited to, $Li_xLa_3Zr_2O_{12}+yAl_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein the term "porous," refers to a material that includes pores, e.g., nanopores, mesopores, or micropores.

II. Sizes

In some examples, set forth herein are a variety of rechargeable battery positive electrode architectures and nanostructures. In some of these examples, the positive electrodes include active materials (intercalation chemistry cathode materials, conversion chemistry cathode materials, or combinations thereof), catholyte materials (small sized ceramic, oxide, or sulfide electrolyte materials) ground, milled, and mixed with the active materials, and optionally binders and electronic conductive additives. In some examples, at least the cathode active materials and the catholyte materials are milled such that the particle size (diameter) ratio of large cathode active material particle sizes to small catholyte particle sizes is at least 3:1 or greater. In some examples, this size ratio (large particle sizes:small particle sizes) is at least 3:1, or at least 3.5:1, or at least 4:1, or at least 4.5:1, or at least 5:1, or at least 5.5:1, or at least 6:1, or at least 6.5:1, or at least 7:1, at least 7.5:1, or at least 8:1, or at least 8.5:1, or at least 9:1, or at least 9.5:1, or at least 10:1, or at least 10.5:1, or at least 11:1, or at least 11.5:1, or at least 12:1, or at least 12.5:1, or at least 13:1, or at least 13.5:1, or at least 14:1, or at least 14.5:1, or at least 15:1, or at least 15.5:1, or at least 16:1, or at least 16.5:1, or at least 17:1, at least 17.5:1, or at least 18:1, or at least 18.5:1, or at least 19:1, or at least 19.5:1, or at least 20:1, at least 20.5:1, or at least 21:1, or at least 215:1, or at least 22:1, or at least 22.5:1, or at least 23:1, or at least 23.5:1, or least 24:1, or at least 24.5:1, or at least 25:1, or at least 25.5:1, or at least 26:1, or at least 26.5:1, or at least 27:1, or at least 27.5:1, or at least 28:1, or at least 28.5:1, or at least 29:1, or at least 29.5:1, or at least 30:1. In some examples, this size ratio (large particle sizes:small particle sizes) is 3:1, 3.5:1, 4:1, 4.5:1, 5:1, 5.5:1, 6:1, 6.5:1, 7:1, 7.5:1, 8:1, 8.5:1, 9:1, 9.5:1, 10:1, 10.5:1, 11:1, 11.5:1, 12:1, 12.5:1, 13:1, 13.5:1, 14:1, 14.5:1, 15:1, 15.5:1, 16:1, 16.5:1, 17:1, 17.5:1, 18:1, 18.5:1, 19:1, 19.5:1, 20:1, 20.5:1, 21:1, 215:1, 22:1, 22.5:1, 23:1, 23.5:1, 24:1, 24.5:1, 25:1, 25.5:1, 26:1, 26.5:1, 27:1, 27.5:1, 28:1, 28.5:1, 29:1, 29.5:1, or 30:1. In some examples, the cathode active particles are the large particles. In some of these examples, the catholyte particles are the small particles.

In some examples, set forth herein are a variety of rechargeable battery positive electrode architectures and nanostructures. In some of these examples, the positive electrodes include active materials, catholyte materials ground, milled, and mixed with the active materials, and optionally binders and electronic conductive additives. In some examples, at least the cathode active materials and the catholyte materials are milled such that the particle size (diameter) ratio of large cathode active material particle sizes to small catholyte particle sizes is at least 3:1 or greater.

In some examples, the active material is NCA and has a $D_{50}$ of either 250-400 nm, 1-2 μm, or 5-6 μm. In these examples, the catholyte has a $D_{50}$ of 250-300 nm.

In some examples, set forth herein are a variety of rechargeable battery positive electrodes including an active material with a particle $D_{50}$ diameter of 1-5 or 5 μm. In some of these examples, the catholyte has a particle $D_{50}$ diameter of 1 μm. In some of these examples, the catholyte has a particle $D_{50}$ diameter of 300 nm.

III. Materials

As demonstrated in Example 1, percolation is achieved at low volume fractions when the size ratio for large positive electrode active material particle sizes to small catholyte particle sizes is about 4:1 or greater. In some examples, set forth herein, the positive electrode active material is selected from oxide intercalation materials selected from the group consisting of $LiMPO_4$ (M=Fe, Ni, Co, Mn), $Li_xTi_yO_z$, wherein x is from 0 to 8, y is from 1 to 12, z is from 1 to 24, $LiMn_2O_4$, $LiMn_{2a}Ni_aO_4$, wherein a is from 0 to 2, $LiCoO_2$, $Li(NiCoMn)O_2$, $Li(NiCoAl)O_2$, and Nickel Cobalt Aluminum Oxides [NCA]. In some other examples, the positive electrode active material includes metal fluoride conversion chemistry materials and is selected from the group consisting of $FeF_2$, $NiF_2$, $FeO_xF_{3-2x}$, $FeF_3$, $MnF_3$, $CoF_3$, $CuF_2$ materials and alloys or combinations thereof. In some other example, the positive electrode active material includes a combination of intercalating oxides and conversion chemistry metal fluorides.

In certain examples, the cathode active materials are nanodimensioned conversion chemistry materials (e.g., $FeF_3$). Suitable cathode active materials are set forth in U.S. Nonprovisional patent application Ser. No. 13/922,214, filed Jun. 19, 2013, entitled NANOSTRUCTURED MATERIALS FOR ELECTROCHEMICAL CONVERSION REACTIONS, and published Jun. 19, 2014, as U.S. Patent Application Publication No. 2014/0170493; also International PCT Patent Application No. PCT/US2015/017584, filed Feb. 25, 2015, and entitled HYBRID ELECTRODES WITH BOTH INTERCALATION AND CONVERSION MATERIALS; also U.S. Provisional Patent Application No. 62/096,510, filed Dec. 23, 2014, and entitled LITHIUM RICH NICKEL MANGANESE COBALT OXIDE (LR-NMC). The entire disclosure of these applications is hereby incorporated by reference herein in its entirety for all purposes.

In certain examples, the positive electrode active material is NCA and has a median particle size of about 5-6 μm. In this particular example, the catholyte required to maintain at least a 4:1 particle size ratio or greater would be a catholyte having a particle size of less than 1.5 μm (e.g., 1.2-1.5 μm).

In certain examples, the positive electrode active material is NCA and has a median particle size of about 5-6 μm. In this particular example, the catholyte required to maintain at least a 4:1 particle size ratio or greater would be a catholyte having a particle size of less than 1.5 μm (e.g., 1.2-1.5 μm).

In certain examples, the positive electrode active material is $FeF_3$ and has a median particle size of about 300 nm. In this particular example, the catholyte required to maintain at least a 4:1 particle size ratio or greater would be a catholyte having a particle size of less than 80 nm (e.g., 60-80 nm).

In certain examples, the positive electrode active material is NCA and has a median particle size ($D_{50}$) of about 4-10 μm. In this particular example, the catholyte required to maintain at least a 20:1 particle size ratio or greater would be a catholyte having a particle size of less than 500 nm (e.g., 200 nm).

In certain examples, the positive electrode active material includes a composite of $FeF_3$, carbon, and an ion conductor, wherein the composite diameter size is 1 µm. In this particular example, the catholyte required to maintain at least a 20:1 particle size ratio, 4:1 particle size ratio, or 1:1 particle size ratio, would be a catholyte having a particle size of, for example, about 50 nm, 250 nm, or 1 µm, respectively.

In certain examples, the positive electrode active material includes a composite of $FeF_3$, carbon, and an ion conductor, wherein the composite diameter is 10 µm. In this particular example, the catholyte required to maintain at least a 20:1 particle size ratio, 4:1 particle size ratio, or 1:1 particle size ratio, would be a catholyte having a particle size of about 500 nm, 2.5 µm, or 10 µm, respectively.

In certain examples, the positive electrode active material includes a composite of $FeF_3$, carbon, and an ion conductor, wherein the composite diameter is 100 µm. In this particular example, the catholyte required to maintain at least a 20:1 particle size ratio, 4:1 particle size ratio, or 1:1 particle size ratio, would be a catholyte having a particle size of about 5 µm, 25 µm, or 100 µm, respectively.

IV. Methods

The instant disclosure is directed to electrochemical devices and materials thereof. More specifically, embodiments set forth herein describe a low-porosity electrode that includes large particles and small particles. The large particles include electrochemically active materials. The small particles include ion conductive materials such as sulfide-based or garnet-based catholytes (e.g., lithium stuffed garnets). In some examples, the large particles and small particles are characterized by a dispersity of no higher than 0.5. There are other embodiments as well.

In some examples, set forth herein are methods for forming an electrode material in which the method includes providing a first plurality of particles and a second plurality of particles, the first plurality of particles being characterized by a first median diameter of less than 10 µm, the second plurality of particles being characterized by an ion conductivity of at least 5e-4S/cm, the first median diameter being at least three times greater than the second median diameter, and the first plurality of particles and the second plurality of particles being characterized by a dispersity of less than 0.25; mixing the first plurality and the second plurality of particles to form a mixed material; and depositing the mixture into an electrode; and compressing the electrode.

In some examples, set forth herein are methods which include the step of drying the mixed material.

In some examples, set forth herein are methods which include the step of depositing the mixed material on a substrate.

In some examples, set forth herein are methods in which the mixing is performed prior to a deposition process.

In some examples, set forth herein are methods which include the step of baking the mixed material.

In those examples in which materials are milled, a variety of milling techniques may be used. For example, the milling technique may be selected from the group consisting of dry milling, planetary milling, cryomilling, jet milling, wet milling, or milling with beads and/or media mill.

As explained above, solid state battery devices can be useful for a number of applications. For example, solid state batteries having solid electrolyte materials may have advantages over conventional batteries that employ liquid electrolytes, those advantages possibly including safety and high temperature operation capability. For a solid state battery to operate efficiently, it is desirable for various components of the solid state battery to have specific characteristics, such as high conductivity, energy density, and capacity. More specifically, solid state battery electrodes may require an active material to be mixed with a fast lithium ion conducting material for high power capability. The electrode may further require an electron conducting component and a binder for electrode cohesion and adhesion. Efficient packing of these solids can be critical to making a high energy density electrode. It is to be appreciated that embodiments described herein include structures and algorithms that provide efficient packing electrode architectures which are useful for high energy density electrodes.

When the various components of a solid state electrode don't pack efficiently, vacant pore space can be generated which reduces at least energy density due to the introduction of wasted volume. In addition to low porosity, poor ion conduction can result from non-percolating networks of catholyte which results in low rate capabilities. Additionally, non-percolating networks of catholyte can result in poor ion access to the electrochemically active materials which results in low energy capacities.

In some examples, set forth herein are methods which include the following steps. In a first step, a sulfide electrolyte is provided. The sulfide electrolyte could include any sulfide electrolyte described herein. The electrolyte is reduced in particle size by milling techniques such as wet milling, in a second step. In a third step, the milled electrolyte is centrifuged and treated to reduce the solvent. In some examples, the treatment includes evaporation of the solvent so that the milled electrolyte is about a 50 w/w % solid/liquid mixture with the liquid being the milling solvent. Depending on the milling conditions, particle sizes of a variety of sizes and distributions can be achieved. The milled electrolyte is then mixed with a cathode active material (or a substitute such as $Al_2O_3$) wherein the active material has a known and stated particle size. In some examples, in this step, binders and optionally carbon are also mixed in with the electrolyte and the active material. In the next step, the mixture of materials is mixed. In the next step, the mixed mixture is cast into a film with a casting technique (e.g., slot die, draw coated, or doctor blade). In the next step, the cast film is dried, for example, on a hot plate or in an oven (~40-200° C., depending on solvents used). In some examples, the methods further include applying pressure or compression to the dried film using calendering techniques.

V. Electrode Architectures Having Mixed Particle Sizes

FIG. 1 is a simplified diagram illustrating an electrode material according to an embodiment of the present invention. This diagram is merely an example, which should not unduly limit the scope of the claims. One of ordinary skill in the art would recognize many variations, alternatives, and modifications. As shown in FIG. 1, the electrode material 100 comprises a large size particle 102 and a small sized particle 101. The relative size and ratio between the large particles and small particles are not drawn to scale, but merely provides an illustration. The large sized particles are an electrochemically active material. The small sized particles are an ion conductive material. For example, the large sized particles include a conversion chemistry material, such as one set forth in U.S. Nonprovisional patent application Ser. No. 13/922,214, filed Jun. 19, 2013, entitled NANOSTRUCTURED MATERIALS FOR ELECTROCHEMICAL CONVERSION REACTIONS, and published Jun. 19, 2014, as U.S. Patent Application Publication No. 2014/0170493; also International PCT Patent Application No. PCT/US2015/017584, filed Feb. 25, 2015, and entitled HYBRID ELECTRODES WITH BOTH INTERCALATION AND CONVERSION MATERIALS; also U.S. Provisional Patent Application No. 62/096,510, filed Dec. 23, 2014, and entitled LITHIUM RICH NICKEL MANGANESE COBALT OXIDE (LR-NMC), each of which is incorporated by reference herein for all purposes. For example, the electrochemically active material may include, but is not limited to, iron fluoride material, copper fluoride material, nickel fluoride material, and/or other types of materials. The small sized particles include solid electrolyte or catholyte material. In certain implementations, the small sized particles can be an ion-conductive electrolyte material including $Li_aX_bP_cS_dO_e$, where X=Si, Ge, Al, Sn, and combinations thereof, and $5 \leq a \leq 15$, $0 \leq b \leq 3$, $1 \leq c \leq 4$, $6 \leq d \leq 18$, $0 < e \leq 5$. For example, ion-conductive electrolyte materials are described in International PCT Patent Application No. PCT/US14/38283, filed May 15, 2014, and entitled SOLID STATE CATHOLYTE OR ELECTROLYTE FOR BATTERY USING $Li_AMP_BSc$ (M=Si, Ge, AND/OR Sn); also, U.S. Pat. No. 8,697,292 to Kanno, et al., the entire contents of both of which are incorporated by reference in their entirety for all purposes. In various embodiments, the relative median size of the large particles (electrochemically active material) is at least three times larger than the relative median size of the small particles (ion conductive material). For example, the large particles can have a median diameter of between 1 and 10 μm or between about 0.1 and 1 μm, and small particles can have a median diameter of between about 200 nm to 2 μm or between about 50-200 nm.

As used herein, $D_{50}$ is a measure of the volume averaged median particle size.

In a conventional battery, the electrochemically active material consists of particles of a size sufficient to substantially charge and discharge in a given time at a given current. The interstices of the conventional active material is wetted with a liquid electrolyte that provides for high lithium ion conductivity to the surface of the active material. In a solid state battery, the liquid must be replaced with a solid catholyte material with high ion conductivity and comparable to the liquid. The electrodes herein are engineered so that the catholyte percolates through the electrode to conduct lithium ions throughout the cathode while consuming a minimal volume. The catholyte does not contribute to the energy density and therefore any catholyte volume tends to reduce the energy density from what it would be in the absence of any catholyte.

In the electrochemical cells described herein, the porosity is minimized, since it also does not contribute to energy storage, either through particle size ratio selection or through compression means. In the electrochemical cells described herein, the volume occupied by large particles should be as large as possible while maintaining high ionic conductivity through the small particles. In the electrochemical cells described herein, the volume occupied by small particles should be as small as possible while maintaining high ionic conductivity through the electrode. In the electrochemical cells described herein, the pore volume should be as small as possible. Also, in the electrochemical cells described herein, the fraction of the small particles that participate in the percolating network, with respect to the total amount of small particles, should be as large as possible. In the electrochemical cells described herein, the fraction of large particles that are contacted by a percolating network of small particles should be as high as possible.

In the example electrochemical electrodes set forth herein, the catholyte comprises small particles which efficiently fill the space between the larger particles of active material. The small sized particles fill into the spaces and gaps of the large particles, and at the same time provide an ion conductive path through the electrode. Since the large, electrochemically active, particles are the main contributor for energy capacity, they preferably make up over 50% of the total volume of the electrode material. The small size particles preferably make up less than 20% of the total volume of the electrode material. It is to be appreciated that the electrode material, with small sized particles as a filler, can be compact and has a porosity of less than 25%.

It is to be appreciated that size and distribution of both large and small particles for the electrode material impact the performance of the solid state battery device. For example, an electrode according to embodiments herein can be charged to 80% of total energy capacity within 2 hours. Dispersity of the large and small particles, both absolute and relative, are configured to suit performance characteristics of the electrode materials. For example, dispersities of large and small particles modulate the ion conductivity, electron conductivity, and recharge characteristics of the electrode material. According to various embodiments, dispersities of both large and small particles of the electrode material are lower than 0.25. For example, if one set of particles has a gaussian distribution $$\left(P(x) = \frac{1}{\sigma\sqrt{2\pi}}\exp\left[-\frac{(x-\mu)^2}{2\sigma^2}\right]\right),$$

the dispersity (σ) of the distribution is the standard deviation of the distribution. In another example, the particle distribution is approximately log-normal $$\left(P(x) = \frac{1}{x\sigma\sqrt{2\pi}}\exp\left[-\frac{(\ln(x)-\mu)^2}{2\sigma^2}\right]\right),$$

in which case the dispersity of the distribution is σ. In various embodiments, the small particles and large particles are uniformly mixed. With a desirable dispersity and size ratio of large to small particles, the fraction of the small particles that participate in a percolating network (e.g., of ions) can be greater than 80%. The fraction of the large particles that are contacted by the percolating network can be greater than 80%. As an example, a measure of dispersity expressed in numerical terms in this application refers to the dispersity of best fit log normal distribution to the experimentally measured particle size distribution. For example, a dispersity value (σ) can be calculated using the formula above. It is to be appreciated that depending on the specific implementations, various dispersity values may be used. As explained above, a dispersity value of less than 0.25 for both large and small particles is suitable for certain applications. In some applications, a dispersity value of less than 0.5 for both large and small particles is used for forming catholyte material.

In addition to large particles of electrochemically active material and small particles of ion conductive materials, the electrode material may further include electron conductive additive materials and/or binder material. For example, the electron conductive additive materials include acetylene black, carbon black, graphene, graphite, activated carbon, C65, C45, VGCF, carbon fibers, carbon nanotubes, ketjen black, and/or others. The binder material may include rubber, a polymer, and/or other types of materials.

Figure 2:
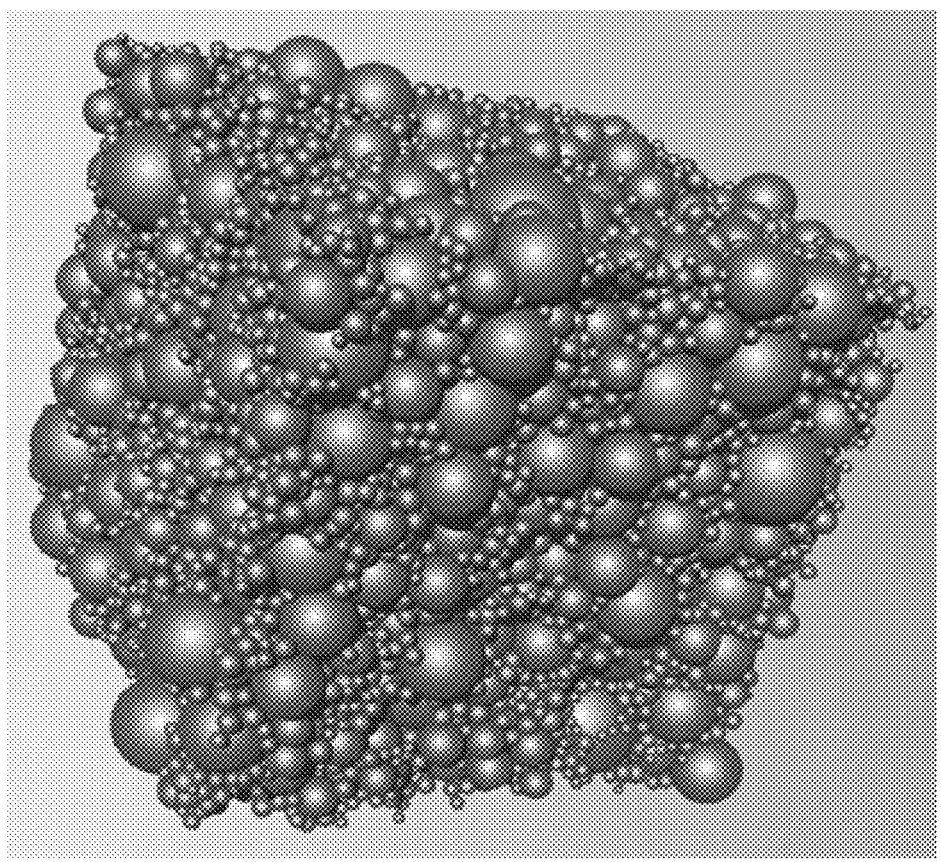
FIG. 2 shows an example electrode having mixed sized particles of active materials and catholyte.

FIG. 2 is a simplified diagram illustrating an electrode material according to an embodiment of the present invention. This diagram is merely an example, which should not unduly limit the scope of the claims. One of ordinary skill in the art would recognize many variations, alternatives, and modifications. As shown in FIG. 2, electrochemically active materials are larger than ion conductive particles, which fill into the space between electrochemically active materials. For example, the electrochemically active materials include cathode active particles, and ion conductive particles include electrolyte (or catholyte) particles.

Figure 3:
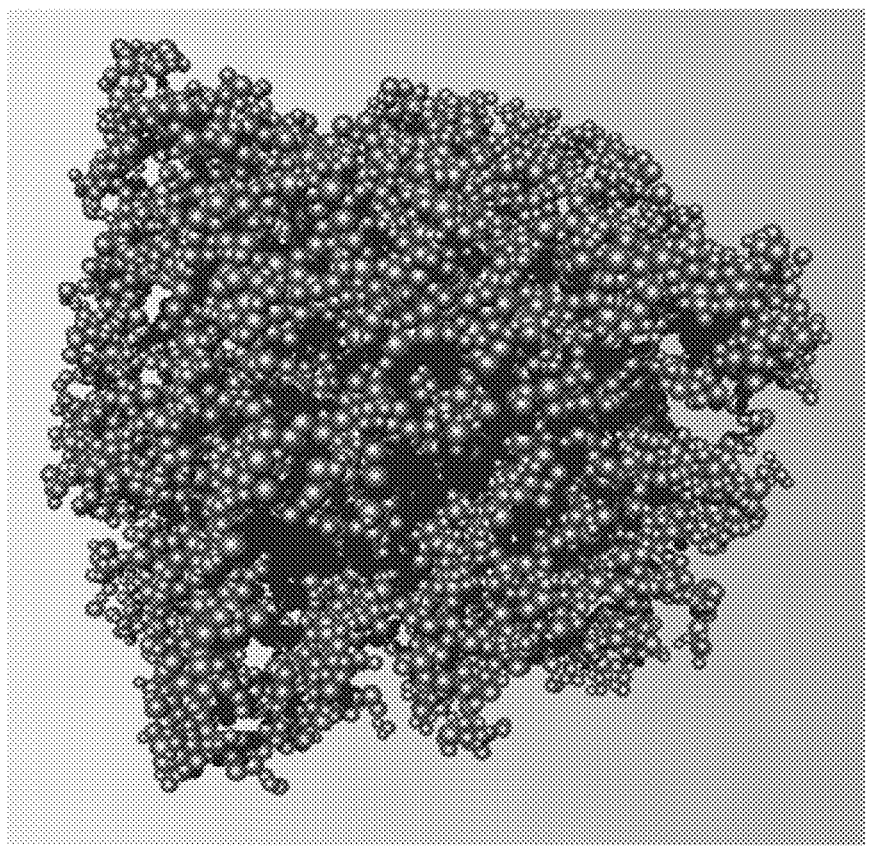
FIG. 3 shows an example percolation network for a catholyte material in a solid state cathode.

FIG. 3 is a simplified diagram illustrating a percolation network according to an embodiment of the present invention. This diagram is merely an example, which should not unduly limit the scope of the claims. One of ordinary skill in the art would recognize many variations, alternatives, and modifications. In FIG. 3, an electrode material is shown with only ion conductive particles, where large electrochemically active material have been removed from the image to better illustrate the percolation network of the small particles. The ion conductive material, is suitable as a catholyte material, as it allows materials such as lithium ion to percolate through the electrode during charge and discharge cycles.

Figure 4:
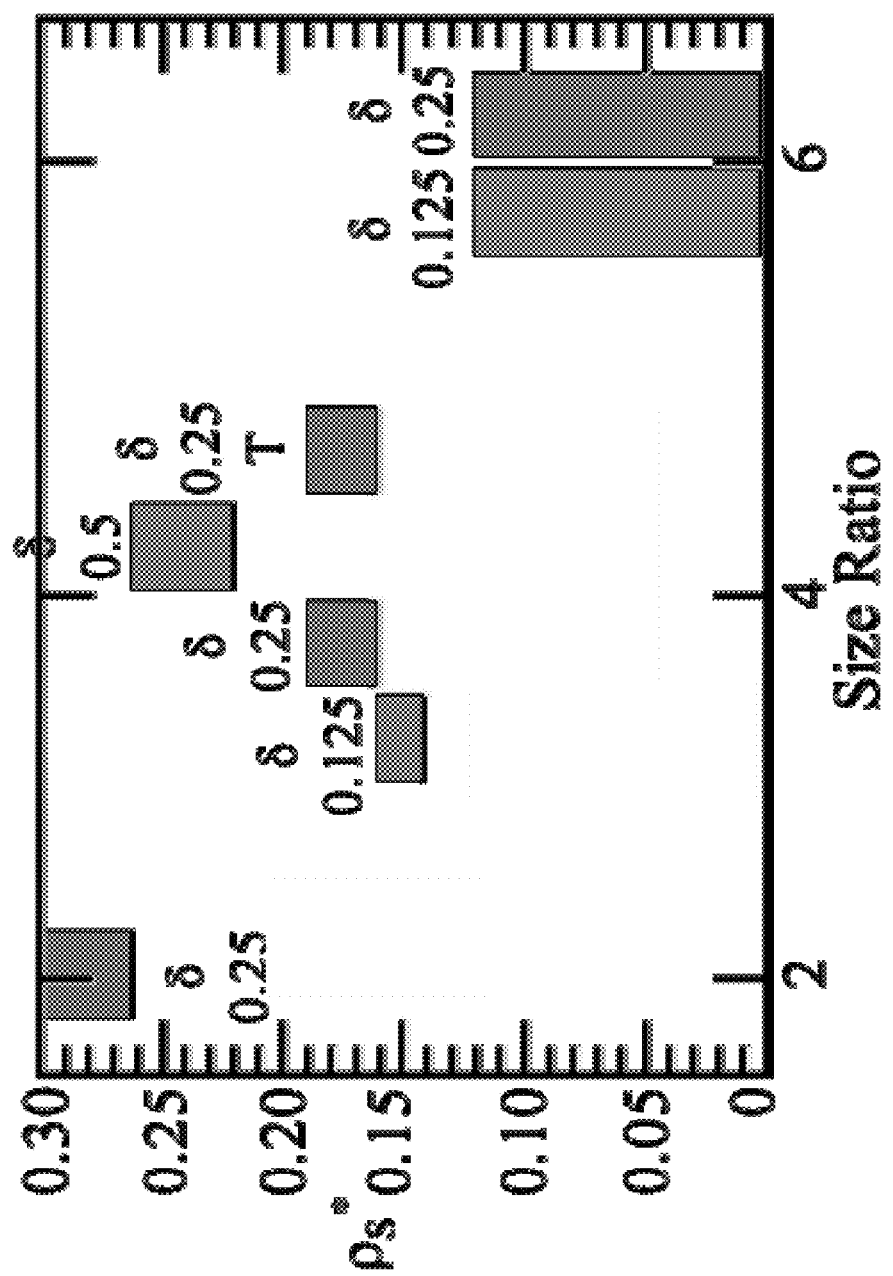
FIG. 4 shows an example percolation threshold as a function of the size (diameter) ratio for large particle sizes to small particle sizes for a randomly packed electrode having mixed sized particles of active materials (large particles) and catholyte (small particles).

FIG. 4 is a simplified graph illustrating the percolation threshold ($\rho_s^*$ where $\rho_s$ is a ratio of volume of small particles ($V_s$) to total particle volume, $V_s/(V_s+V_l)$) versus the particle size (diameter) ratio between large particles and small particles of a randomly packed electrode material. This diagram is merely an example, which should not unduly limit the scope of the claims. One of ordinary skill in the art would recognize many variations, alternatives, and modifications. FIG. 4 illustrates the relationship between percolation threshold $\rho_S^*$ and size ratio between the large and small particles in an electrode. For example, a size ratio of 6 on the graph means that the median diameter of large particles is about 6 times larger in diameter than the median small particle. Generally, percolation threshold $\rho_S^*$ decreases as the size ratio increases. However, for larger size ratios percolation can be achieved via many small contacts that may not provide effective conductivity. For example, ignoring contacts with contact radius<1 nm, the percolation threshold increases and becomes much less sensitive to size ratio. FIG. 4 illustrates percolation threshold for 7 sample distributions where particles are packed with no compression. It is to be understood that $\rho_S^*$ is determined to be within a range. For size ratio 6, $\rho_S^*$ is bound between about [0, 0.12]. It is to be appreciated that $\rho_S^*$<0.12 is lower than expected, since at other size ratios, $\rho_S^*$ typically stayed above 0.15. For example, FIG. 4 shows that $\rho_S^*$ decreases with size ratio and increases with dispersity.

Figure 5:
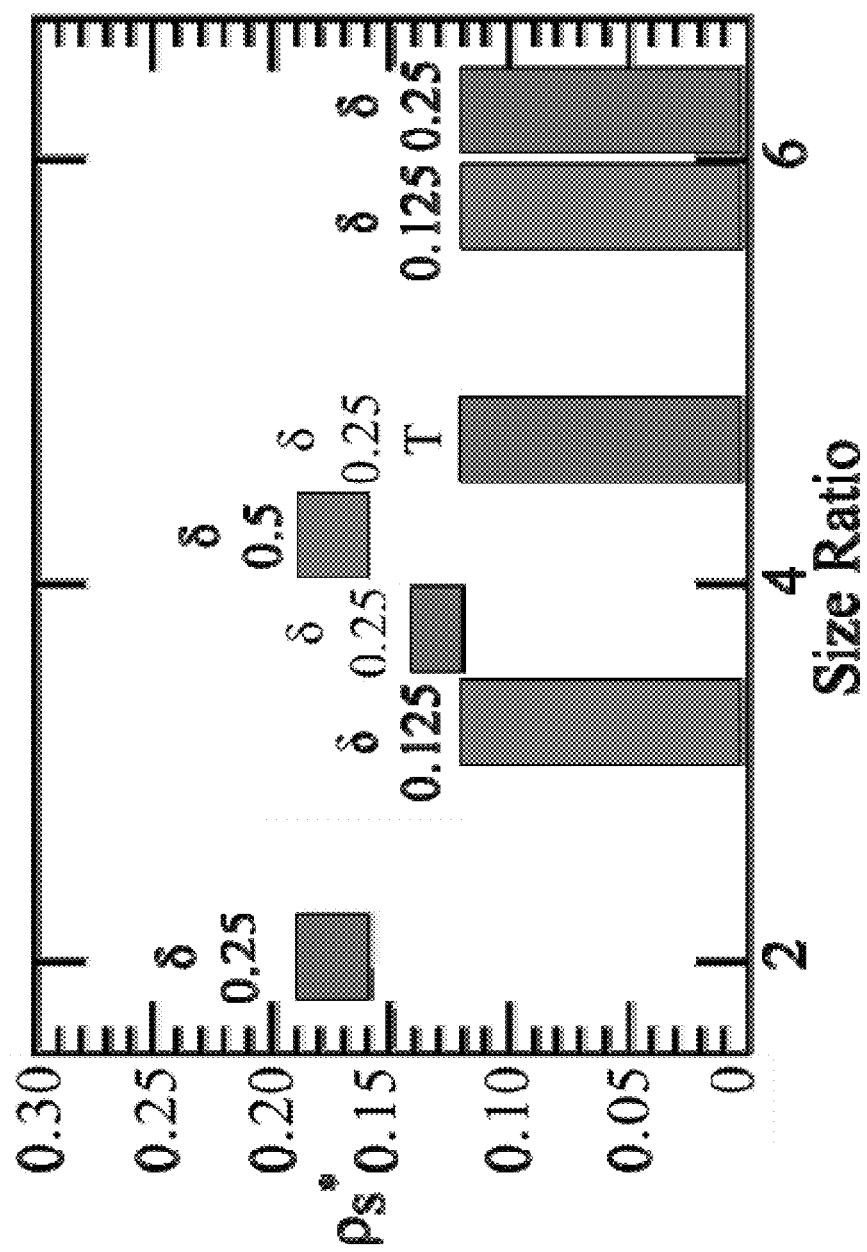
FIG. 5 shows an example percolation threshold as a function of the size ratio for large particle sizes to small particle sizes for a compression packed electrode.

FIG. 5 is a simplified graph illustrating size ratio between large particles and small particles of a compression packed material according to embodiments set forth herein. This diagram is merely an example, which should not unduly limit the scope of the claims. One of ordinary skill in the art would recognize many variations, alternatives, and modifications. As can be seen in FIG. 5, compression of particles results in change in percolation threshold. More specifically, percolation threshold for the 7 distributions under a slight compression of 2% lowers the percolation threshold, illustrating the desirability of compression.

Figure 6:
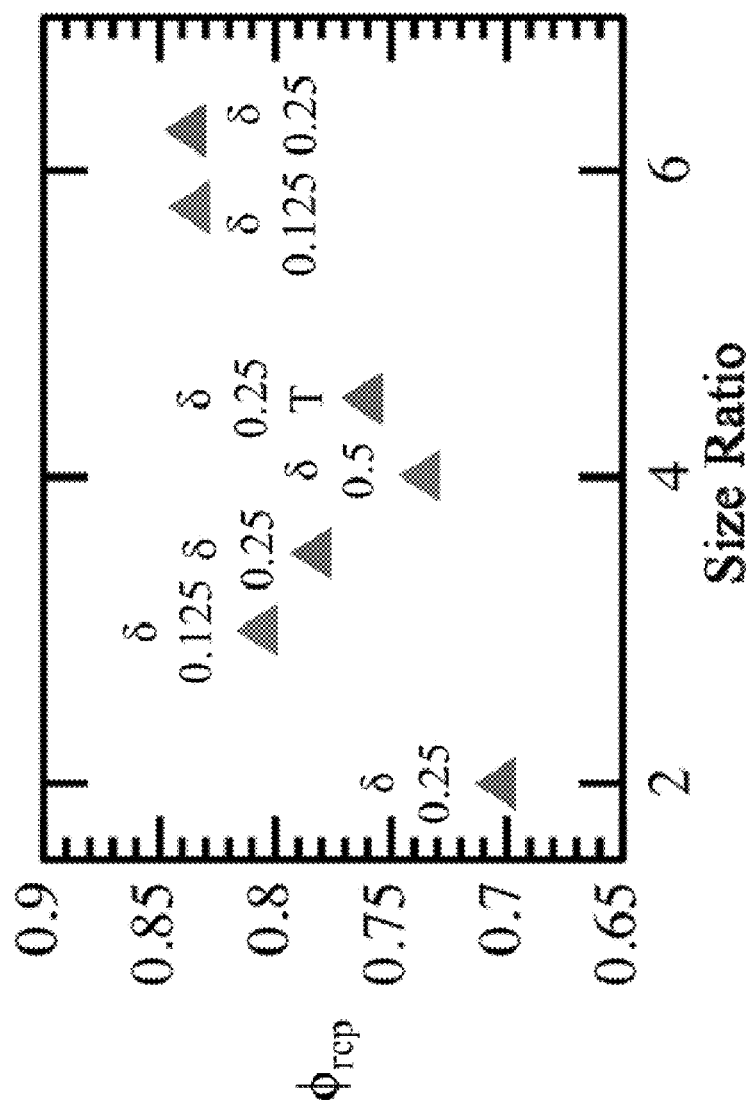
FIG. 6 shows random packing densities as a function of the size ratio for large particle sizes to small particle sizes.

FIG. 6 is a simplified diagram illustrating random packing density in relation with particle size ratio according to embodiments set forth herein. This diagram is merely an example, which should not unduly limit the scope of the claims. One of ordinary skill in the art would recognize many variations, alternatives, and modifications. In FIG. 6, the $\varphi_{rcp}$=total volume of particles/volume of a container. For example, $\varphi_{rcp}$=1 means that the volume of a container is fully packed. If the size ratio is 1, it is known that the maximum packing of random close-packed spheres is $\varphi_{rcp} \approx 0.64$. FIG. 6 shows the random close packing fraction for percolated systems. It can be seen that $\varphi_{rcp}$ increases with size ratio and may decrease with dispersity. With a size ratio greater than 1, values of $\varphi_{rcp}$>0.64 may be achieved, which illustrates a benefit of having a size difference between catholyte and active particles in an electrode. As explained above, it is desirable for an electrode material to have a high packing density.

Figure 7:
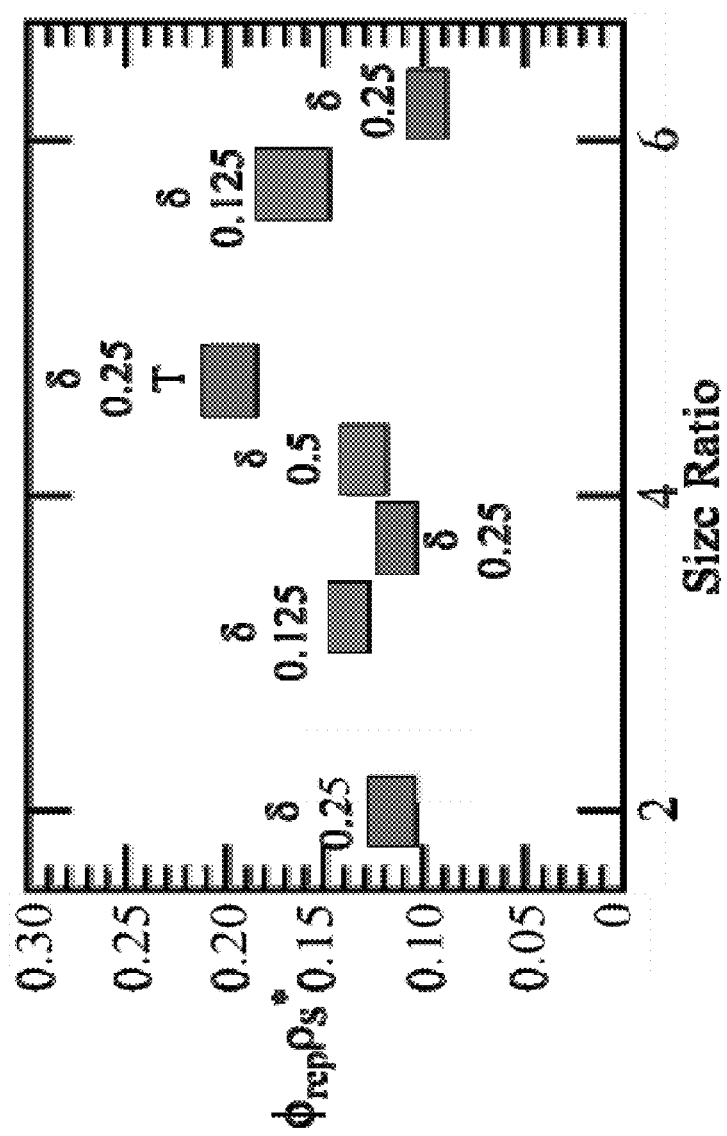
FIG. 7 shows percolation threshold renormalized to the total container volume fraction occupied by small particles for a collection of large particles and small particles in an electrode

FIG. 7 is a simplified graph illustrating a percolation threshold renormalized to the total fraction of a container's volume occupied by small particles for different particle size ratios. This diagram is merely an example, which should not unduly limit the scope of the claims. One of ordinary skill in the art would recognize many variations, alternatives, and modifications. More specifically, the product $\varphi_{rcp}\rho_S^*$ value on the vertical axis of FIG. 7 gives the total fraction of a container's volume occupied by small particles $\varphi_S$ at the percolation threshold. For the purpose of illustration in FIG. 7, a 2% compression (volume) is used for packing, and contacts with $R_C$<1 nm is ignored. Compression, herein, means that the simulation box size was decreased by 2%, resulting in a particle-particle overlap of about 2%. This is model for particle necking. The graph shows that at the percolation threshold, $\varphi_S$ is nearly constant with size ratio and dispersity. The graph suggests that if the small particles occupy >14% of the total container's volume, for sufficiently low dispersity and sufficiently high size ratio, percolation will occur.

In several examples, compression is applied to an electrode. Compression may be applied by a calendering mill with roller diameter of greater than 90 mm, 100 mm, 110 mm, or 120 mm, and a line pressure of greater than 8 MPa, 9 MPa, 10 MPa, 11 MPa on an electrode strip of less than 300 mm width at a feed rate of less than 5 cm/s.

Figure 8:
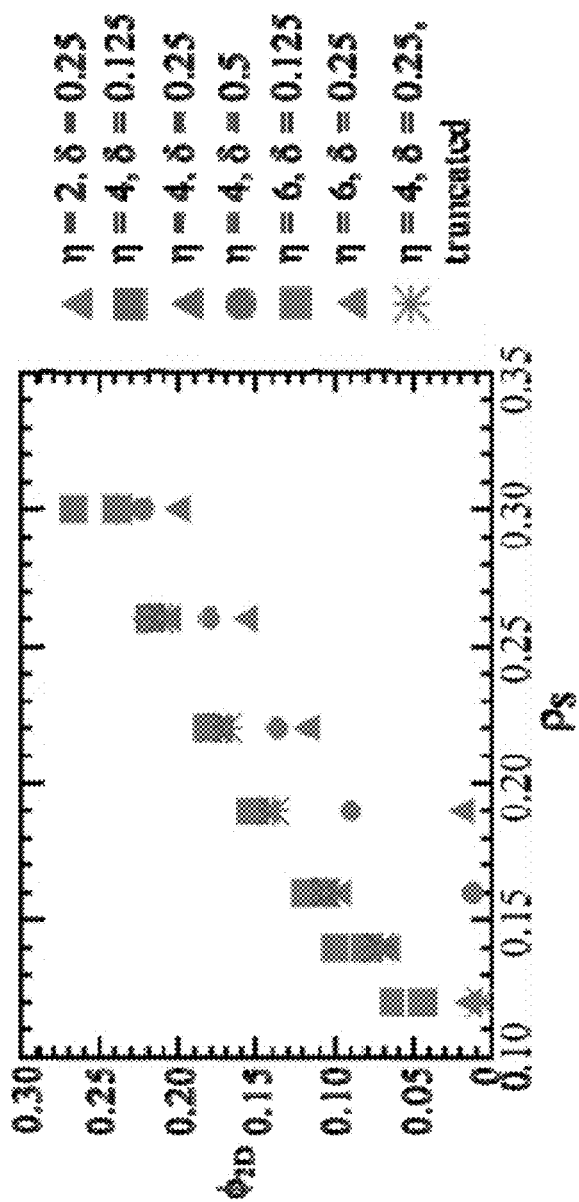
FIG. 8 shows a 2D cross sectional area fraction occupied by the small particles as a function of small particle volume in an electrode having large and small particle sizes.

FIG. 8 illustrates a 2D cross sectional area fraction occupied by the small particles as a function of small particle volume according to embodiments set forth herein. This diagram is merely an example, which should not unduly limit the scope of the claims. One of ordinary skill in the art would recognize many variations, alternatives, and modifications. As shown in FIG. 8, the cross section area $\varphi_{2D}$ is on the vertical axis as a function of the volume occupied by small particles, $\rho_S$, for 7 distributions. FIG. 8 shows that the cross sectional area covered by percolated particles grows roughly linear with $\rho_S$ and is nearly the same for all distributions except for the size ratio 2 and the truncated distribution.

In the Figures herein, the $\delta$ is the dispersity and $\eta$ is the median particle diameter ratio ($d_l/d_s$).

Figure 9:
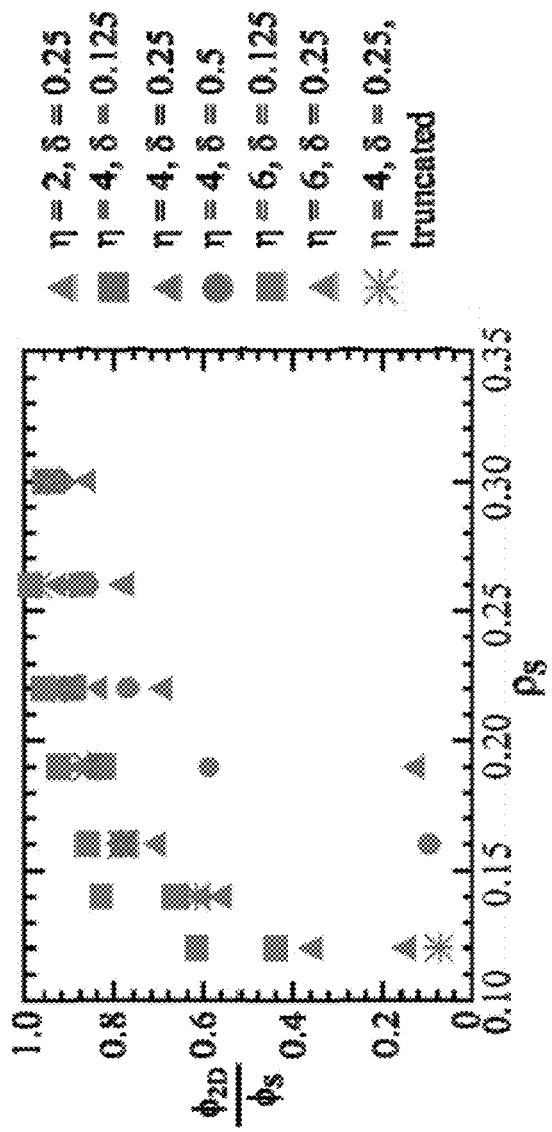
FIG. 9 shows a normalized 2D cross sectional area fraction as a function of percolation threshold for an electrode with 2% compression.

FIG. 9 illustrates a normalized 2D cross sectional area fraction as a function of percolation threshold for an electrode with 2% compression according to embodiments of the invention. This diagram is merely an example, which should not unduly limit the scope of the claims. One of ordinary skill in the art would recognize many variations, alternatives, and modifications. The variable $\varphi_S$ refers to a fraction of a 2D cross-section of a 3D container's volume occupied by all small particles. The variable $\varphi_{2D}$ refers to the fraction of a 2D cross section of a 3D container's volume occupied by small particles that are part of the percolation network. FIG. 9 shows the cross sectional area fraction normalized by $\varphi_S$ as a function of small particle volume, $\rho_S$. The ratio $\varphi_{2D}/\varphi_S$ is equal to 1 when all of the small particles are contributing to the percolating cluster. As shown in the graph, except for size ratio 2 and the truncated distribution, nearly all the small particles are contributing to the percolating cluster for $\rho_S > 0.20$. The results show that for $\rho_S > 0.20$, the assumption that $\varphi_{2D} \approx \varphi_S$ provides a good approximation.

Figure 10:
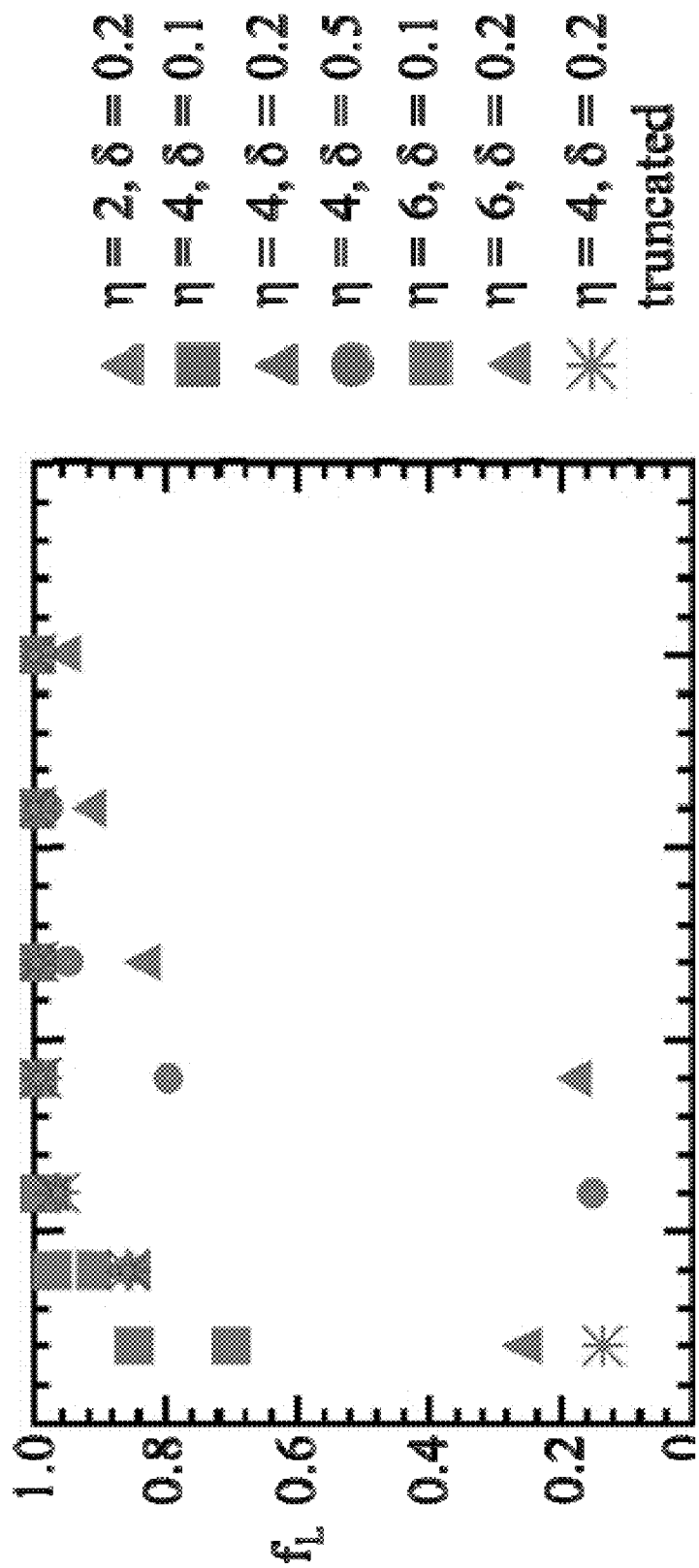
FIG. 10 shows fraction of large particles in contact with percolating particles as a function of the fraction of small particles

FIG. 10 illustrates the relationship between fraction of large particles in contact with percolating particles as a function of the fraction of small particles according embodiments set forth herein. This diagram is merely an example, which should not unduly limit the scope of the claims. One of ordinary skill in the art would recognize many variations, alternatives, and modifications. In these examples, the materials in the graph with are compressed at 2% volume. More specifically, the graph shows the fraction of large particles in contact with a small percolating particle as a function of $\rho_S$ for 7 distributions. The data show that at close to the percolation threshold ($\rho_S \sim 10\text{-}15\%$), nearly all of the large particles are in contact with a small percolating particle.

Figure 11:
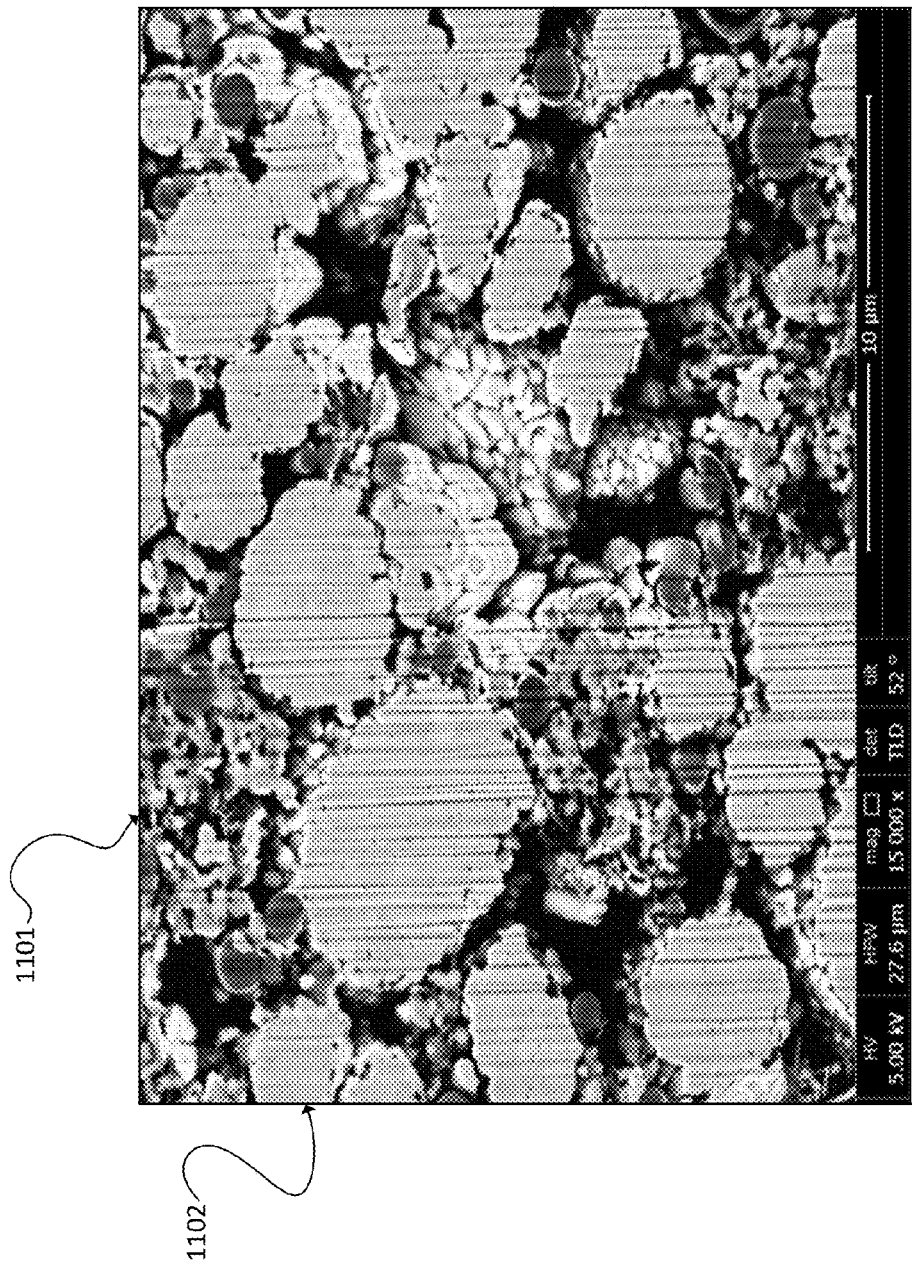
FIG. 11 shows an SEM photo illustrating an electrode material with large and small particles without substantial compression. The large particles (1102) are Nickel Cobalt Aluminum Oxide (NCA) and the small particles (1101) are LSTPS sulfide electrolyte.

FIG. 11 is an SEM photo illustrating an electrode material with large and small particles without substantial compression. As can be seen in FIG. 11, large and small particles are homogeneously mixed, where large particles are in contact with small particles. In FIG. 11, the large particles have a median diameter of about 5 µm and the small particles have a median diameter of about 300 nm.

Figure 12:
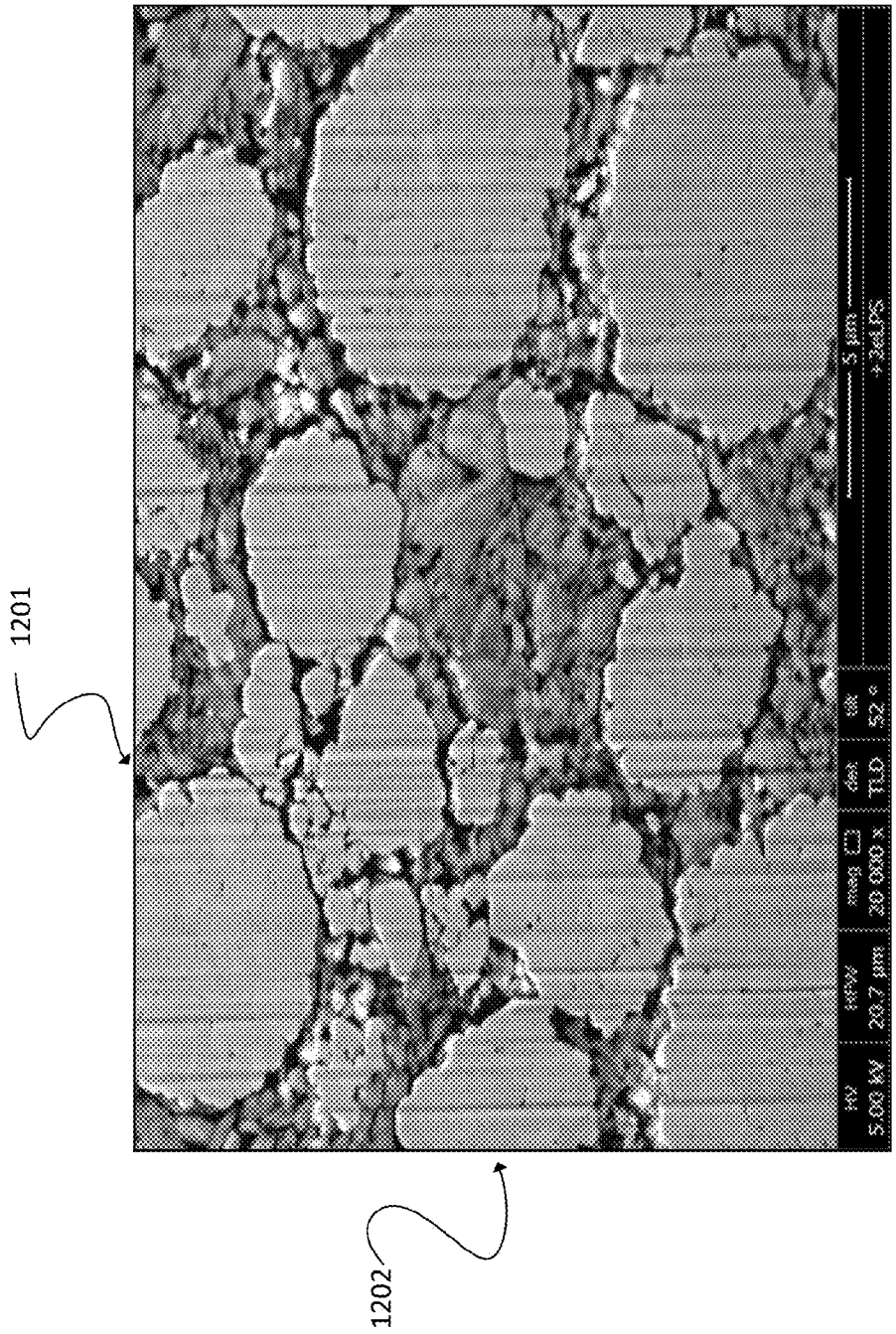
FIG. 12 shows an SEM photo illustrating an electrode material with large and small particles after being subjected to a compression process. The large particles (1202) are Nickel Cobalt Aluminum Oxide (NCA) and the small particles (1201) are LSTPS sulfide electrolyte.

FIG. 12 is an SEM photo illustrating an electrode material with large and small particles after being subjected to a compression process. As can be seen in FIG. 12, small particles tightly fill into spaces between large particles. As can be seen the large particles have a median diameter of about 5 µm and the small particles have a median diameter of about 300 nm. The porosity of the electrode shown is measured to be less than 20%, as predicted. In some examples, the compression process includes a uniaxial compression or a calendering mill.

Figure 13:
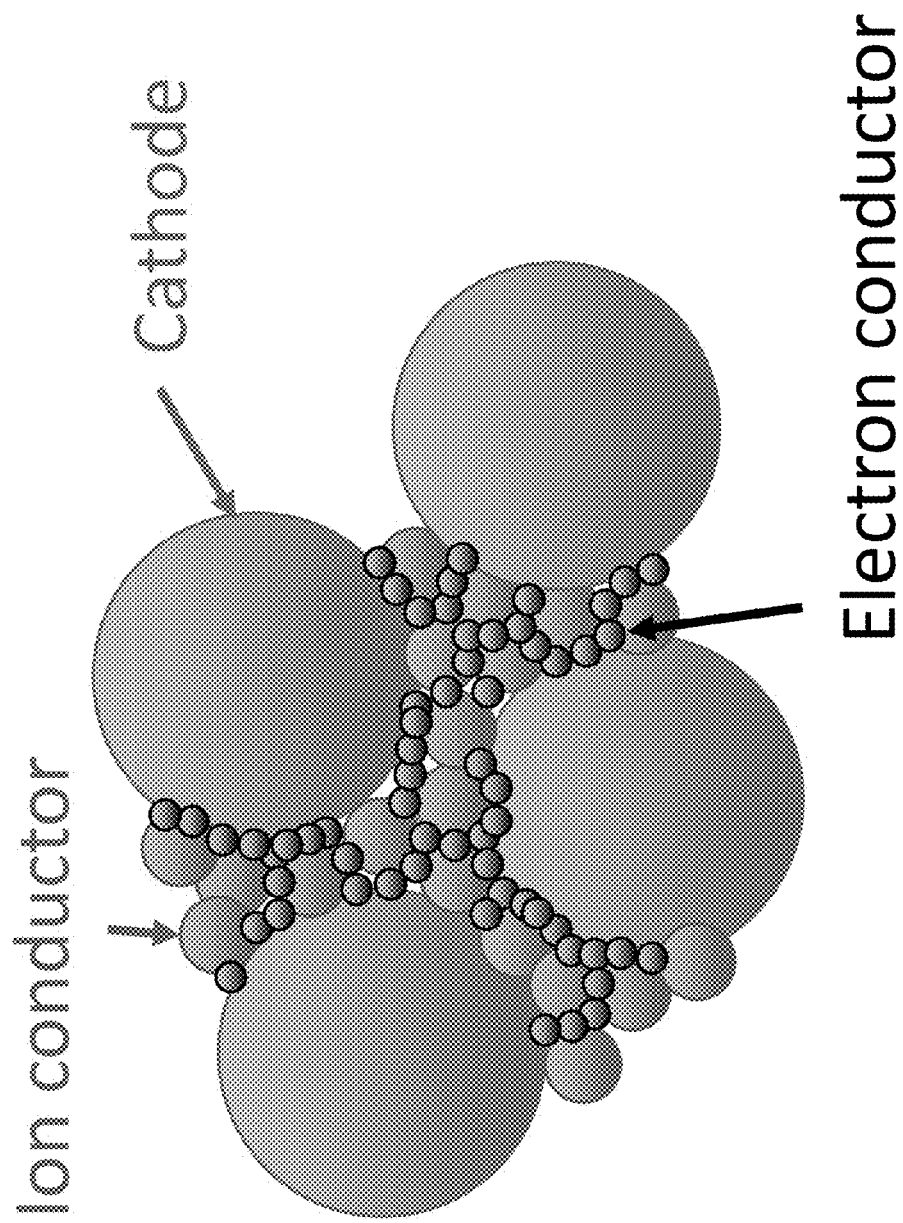
FIG. 13 shows an example positive electrode assembly having large particle cathode active materials, small particle catholyte ion conductors necked to form a percolation network and an electron conductor additive.

FIG. 13 is an illustration of the electrode material shown in FIG. 11. In FIG. 13, the largest average sized particles are the cathode active material particles. The next largest average sized particles are the catholyte particles. Lastly, the smallest average sized particles are the electronically conductive additives.

While the above is a full description of the specific embodiments, various modifications, alternative constructions and equivalents may be used. Therefore, the above description and illustrations should not be taken as limiting the scope of the present invention which is defined by the appended claims.

VI. Electrochemical Electrodes

In some examples, set forth herein is a solid state electrode of an electrochemical device including a first plurality of particles of electrochemically active material, the first particles having a first particle size distribution characterized by a first dispersity of 0.25 or less and a first median diameter. In some examples, the first median diameter is from about 10 nm to about 10 µm. In certain examples, the first median diameter is about 10, 15, 20, 25, 30, 35, 40, 45, 50, 55, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or 500 nm. In certain examples, the first median diameter is about 0.1, 0.5, 1, 1.5, 2, 2.5, 3, 3.5, 4, 4.5, 5, 5.5, 6, 6.5, 7, 7.5, 8, 8.5, 9, or 10 µm. In some examples, the electrode includes a second plurality of particles of ion conductive material, the second particles having a second particle size distribution characterized by a second dispersity of 0.25 or less and a second median diameter, the second median diameter being at least three times smaller than the first median diameter.

In some examples, the electrode has a volume fraction of second particles that is less than 20% relative to the total particle volume of the electrode.

In some examples, the electrode is characterized by a porosity of less than 20 volume percent. In certain examples, the porosity is less than 15% v/v. In certain other examples, the porosity is less than 10% v/v.

In some examples, the ion conductive material in the electrode includes $Li_aX_bP_cS_dO_e$, where X=Si, Ge, Al, Sn, and combinations thereof, and $5 \leq a \leq 15$, $0 \leq b \leq 3$, $1 \leq c \leq 4$, $6 \leq d \leq 18$ $0 < e \leq 5$. In some examples, X is Si. In other examples, X is Si and Sn. In some other examples, X is Sn. In yet other examples, X is Ge. In some examples, X is Si and Ge.

In some examples, the electrodes herein can be charged within two (2) hours to have a capacity that is 80% or more of the electrode capacity.

In some examples, the electrodes herein further include an electron conductive additive selected from acetylene black, graphene, graphite, carbon black, activated carbon, C65, C45, VGCF, carbon fibers, carbon nanotubes, ketjen black, or combinations thereof.

In some examples, the electrodes herein further include a binder material, wherein the binder material includes a rubber and/or a polymer.

In some examples, the electrodes herein further include a percolating network composed of a fraction of second particles participating in the percolating network at a ratio of greater than 80%. In some examples, 80% of the second particles are bonded in the percolating network. In some other examples, 85% of the second particles are bonded in the percolating network. In some other examples, 90% of the second particles are bonded in the percolating network. In some other examples, 95% of the second particles are bonded in the percolating network. In some other examples, 100% of the second particles are bonded in the percolating network. In some examples, the electrodes herein further include a percolating network, a fraction of the first plurality of particles contacting the percolating network at a ratio of greater than 80%.

In some examples, set forth herein is a solid state electrochemical electrode including active materials characterized by a first particle size distribution having a first median particle size; and catholyte materials characterized by a second particle size distribution having a second median particle size; wherein the volumetric ratio of active materials to catholyte materials is from 99:1 to 1:1; and wherein the particle size ratio of the first median particle size to the second median particle size is at least 3:1 or greater.

In some examples, set forth herein is a solid state electrochemical electrode wherein the first particle size distribution has a dispersity of 0.25 or less.

In some examples, set forth herein is a solid state electrochemical electrode wherein the second particle size distribution has a dispersity of 0.25 or less.

In some examples, set forth herein is a solid state electrochemical electrode wherein the electrode has a porosity of less than 20% by volume.

In some examples, set forth herein is a solid state electrochemical electrode further comprising an electron conductive additive, the electron conductive additive including acetylene black, carbon black, activated carbon, C65, C45, VGCF, carbon fibers, carbon nanotubes, and/or ketjen black. In some of these examples, the electrochemical cell further comprising a binder material, the binder material selected from a rubber or a polymer.

In some examples, set forth herein is a solid state electrochemical electrode wherein the catholyte particles form a percolating network.

In some examples, set forth herein is a solid state electrochemical electrode, wherein more than 80% of the catholyte particles in the electrode are bonded within the percolating network.

VII. EXAMPLES

In the examples described herein, unless otherwise provided, the subscript values in the solid state electrolytes set forth herein represent the elemental molar ratios of the precursor chemicals used to make the claimed composition. Actual empirical elemental molar ratios of the electrolytes may be different if determined by an analytical technique, and can vary from technique to technique, e.g., x-ray fluorescence spectroscopy or inductively coupled plasma spectroscopy.

Example 1

Packing Ratios

Figure 14:
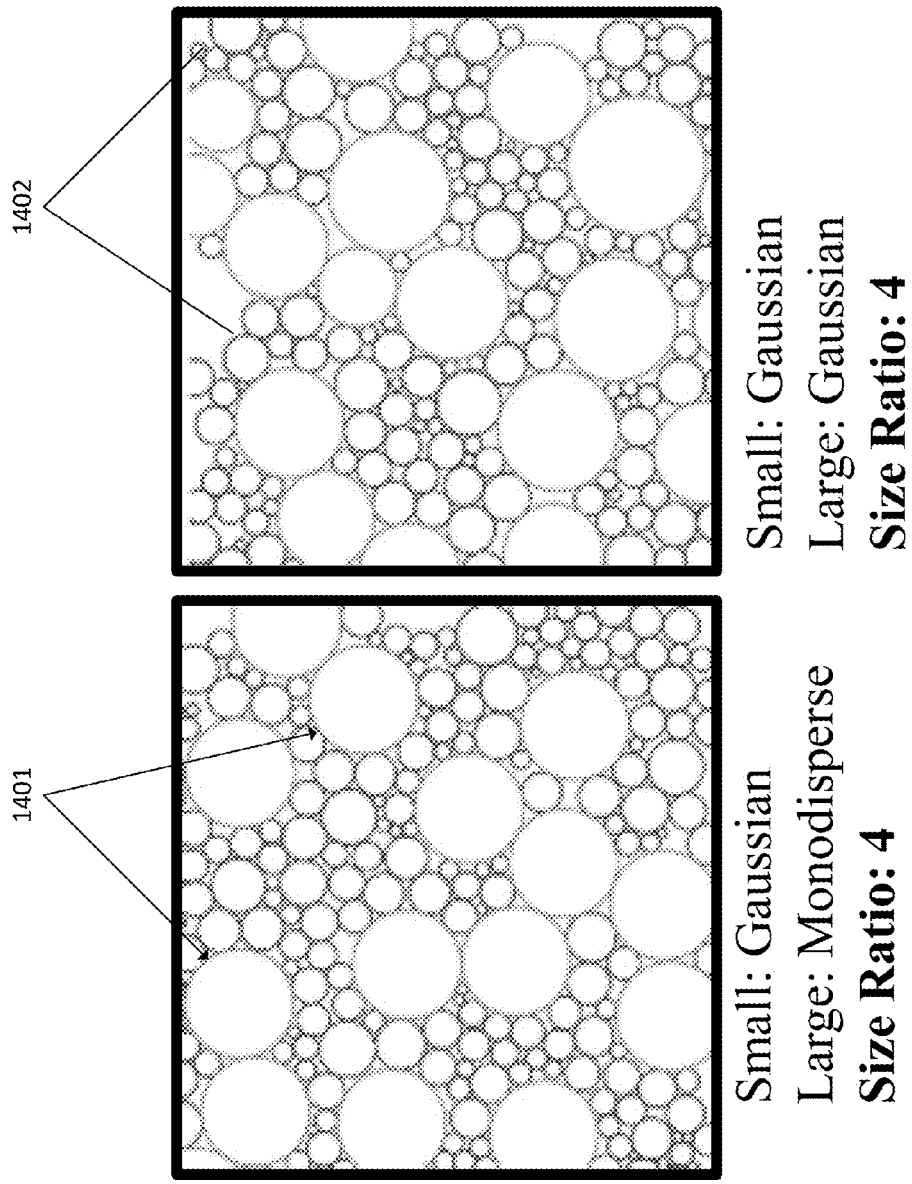
FIG. 14 shows example cathode packing architectures in which either (left side) a monodisperse collection of large sized particles is mixed with a Gaussian distribution of small sized particles, or (right side) a Gaussian distribution of large sized particles is mixed with a Gaussian distribution of small sized particles, in which in either case the ratio of large particle sizes (diameter) to small particle sizes is 4.

In this Example, a variety of packing scenarios were considered and the packing density and percolation conductivity was determined. As shown in FIG. 14, one packing scenario included two particle sizes in the electrode. As shown on the left side of FIG. 14, the large sized particles (1401, cathode active materials) were monodisperse while the small sized particles included a Gaussian distribution of small particle sizes (1402, catholyte ion conductors). As shown on the right side of FIG. 14, another scenario was considered in which both the large sized particles and the small sized particles were a Gaussian distribution of particle sizes. The ratio of the diameter of the large sized particles to small sized particles was fixed at 4 in each instance in this instant Example.

Figure 15:
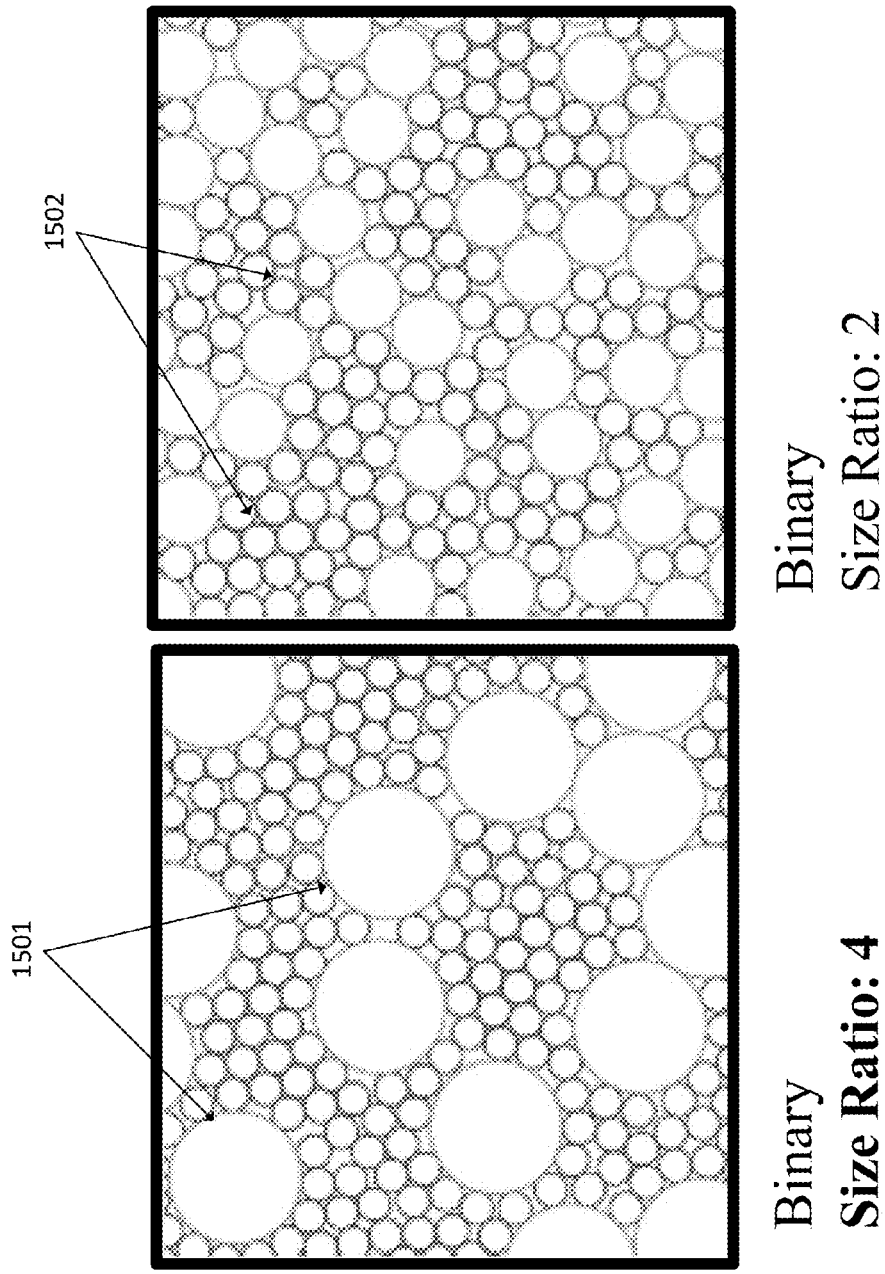
FIG. 15 shows example cathode packing architectures in which either (left side) a monodisperse collection of large sized particles is mixed with a monodisperse collection of small sized particles, in which case the ratio of large particle sizes (diameter) to small particle sizes is 4; or (right side) a monodisperse collection of large sized particles is mixed with a monodisperse collection of small sized particles, in which case the ratio of large particle sizes (diameter) to small particle sizes is 2.

In this Example, in a second aspect, other packing scenarios were also considered and the packing density and percolation conductivity was determined. As shown in FIG. 15, one packing scenario included two particle sizes in the electrode. As shown in FIG. 15, both the large sized particles (1501, cathode active materials) and the small sized particles (1502, catholyte ion conductors) were monodisperse particle size collections. As shown on the left side of FIG. 15, one scenario included the particle size (diameter) ratio, for the large sized particles with respect to the small sized particles, fixed at 4. As shown on the right side of FIG. 15, another scenario included the particle size (diameter) ratio, for the large sized particles with respect to the small sized particles, fixed at 2.

Example 2

Conductivity as a Function of Particle Size Ratio

In this Example, $Al_2O_3$ and LSTPS were individually milled to 5-6 μm and 200-250 nm, respectively. These sizes give a large particle size to small particle size ratio of about 20:1. In a separate batch, $Al_2O_3$ and LSTPS were individually milled to 1.25-1.5 μm and 200-250 nm, respectively. These sizes give a large particle size to small particle size ratio of about 5:1. In a third separate batch, $Al_2O_3$ and LSTPS were individually milled to the same size of 200-250 nm, respectively. These sizes give a large particle size to small particle size ratio of about 1:1. In this Example, ionic conductivity was measured. $Al_2O_3$ was used as a substitute for a cathode active material.

The electrode formulation was prepared, generally, by providing a slurry comprising milled $Al_2O_3$, LSTPS, binder and a solvent. The slurry was cast and allowed to dry on a substrate (e.g., Al or stainless steel). Compression was applied to the dried resultant material using a uniaxial press to apply about 200 to 300 MPa of pressure. In this Example, the LSTPS particle size was set at a $D_{50}$ of 250-300 nm and the particle size of the $Al_2O_3$ was varied to result in the aforementioned particle size ratios.

Each sample was placed in contact with a Li-including electrode and the conductivity of the electrode formulation was observed. The results are show in FIG. 16.

Figure 16:
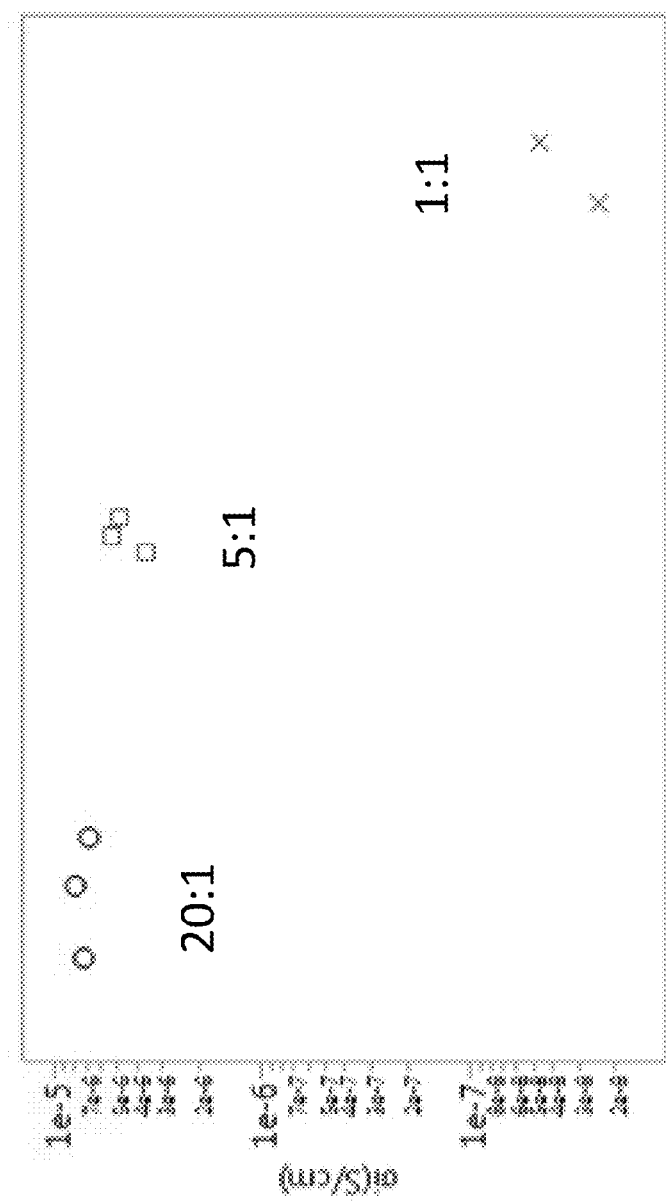
FIG. 16 shows a plot of conductivity as a function of the size ratio for large particle sizes to small particle sizes in three example cathodes in which the size ratio was either 20:1, 5:1, or 1:1 for large particle sizes (oxide) to small particle sizes (sulfide catholyte). In each sample, the volumetric ratio for large particle sizes (oxide) to small particle sizes (sulfide catholyte) was 80:20.

As shown in FIG. 16, those electrode formulations that had a particle size ratio for large particle sizes to small particle sizes of 20:1 and 5:1 were observed to have higher measurable ionic conductivity than those electrode formulations that had a particle size ratio for large particle sizes to small particle sizes of 1:1. Those electrode formulations that had a particle size ratio for large particle sizes to small particle sizes of 1:1 had nearly two orders of magnitude lower conductivities values than those electrode formulations that had a particle size ratio for large particle sizes to small particle sizes of at least 5:1 or greater. In this Example, those electrode formulations that had a particle size ratio for large particle sizes to small particle sizes of at least 5:1 or greater were observed to have a $\sigma_i$ (ionic conductivity) of about 5-7e-6 S/cm. Based on the trend suggested by the data in FIG. 16, the highest percolation conductivity was determined for large particle to small particle size ratios of 4:1 or greater.

Figure 17:
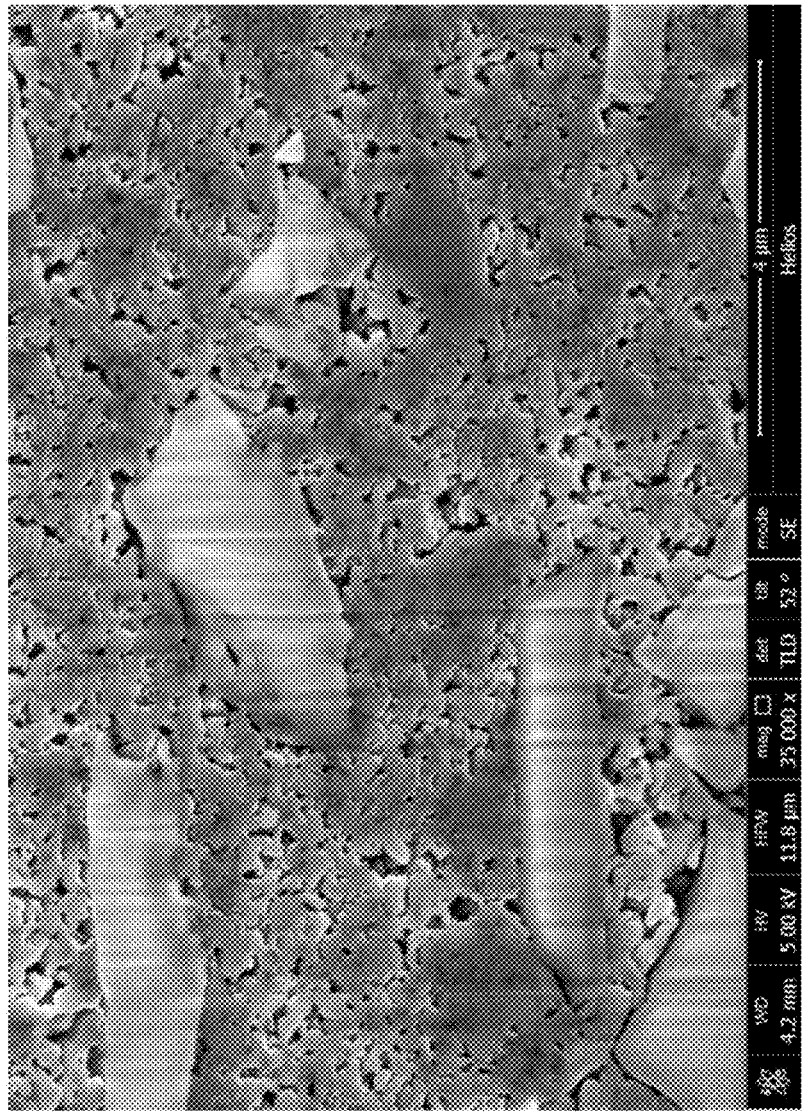
FIG. 17 shows a scanning electron microscopy (SEM) image for an example cathode having a 20:1 size ratio for large particle sizes ($Al_2O_3$) to small particle sizes (LSTPS sulfide catholyte).
Figure 18:
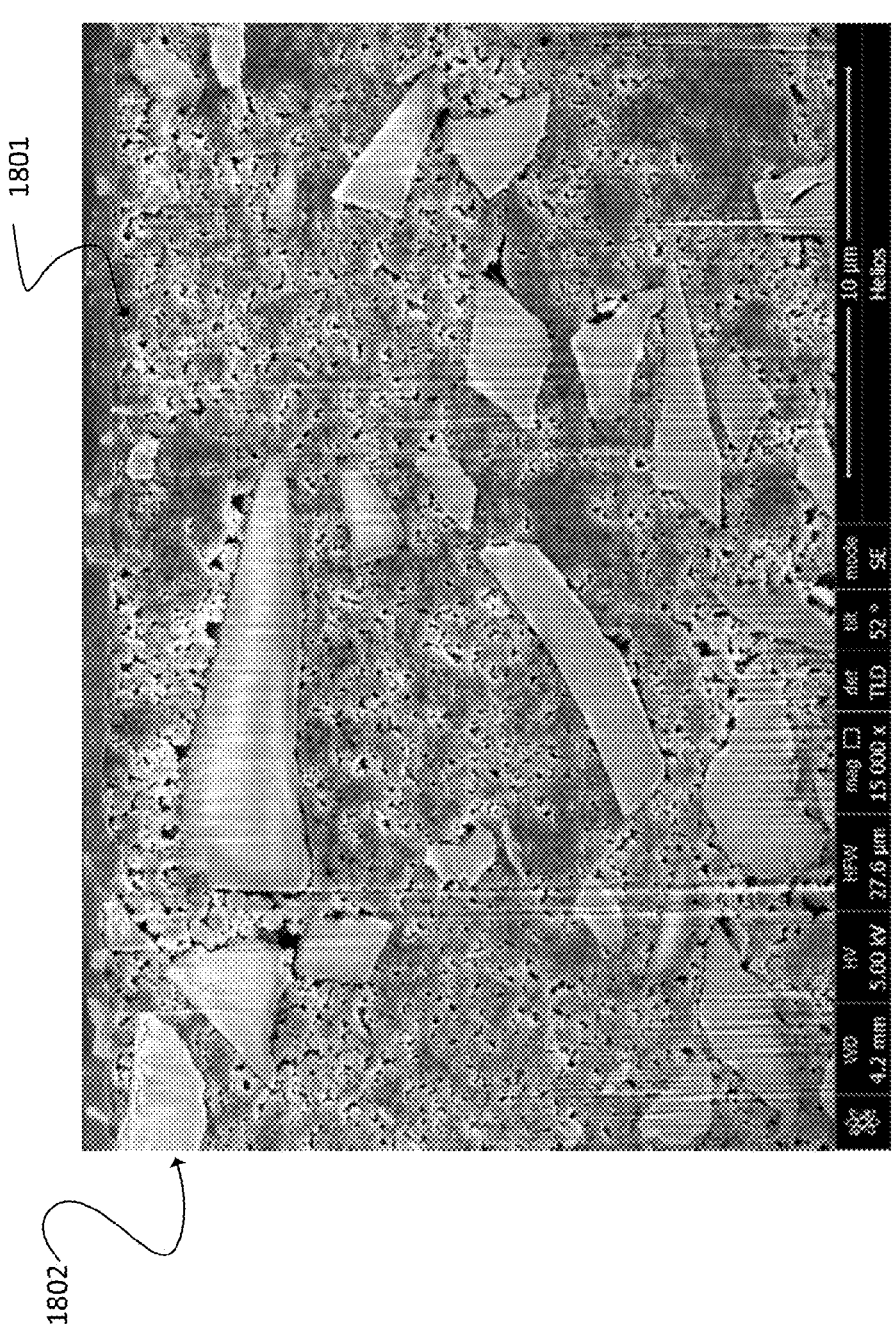
FIG. 18 shows a scanning electron microscopy (SEM) image for an example cathode having a 20:1 size ratio for large particle sizes ($Al_2O_3$) to small particle sizes (LSTPS sulfide catholyte).

As shown in FIG. 17, the $Al_2O_3$ particles (1702) had an approximate particle diameter of 4-6 μm and the LSTPS particles (1701) had an approximate particle diameter of about 250 nm. As shown in FIG. 18, the $Al_2O_3$ particles (1802) and the LSTPS particles (1801) are homogenously mixed. The LSTPS particles (1801) are observed to neck, or share or contact surfaces, far more so than the $Al_2O_3$ particles (1802). In this way, LSTPS particles (1801) are observed to form a percolation network in the electrode formulation through which Li+ ions can conduct.

Figure 19:
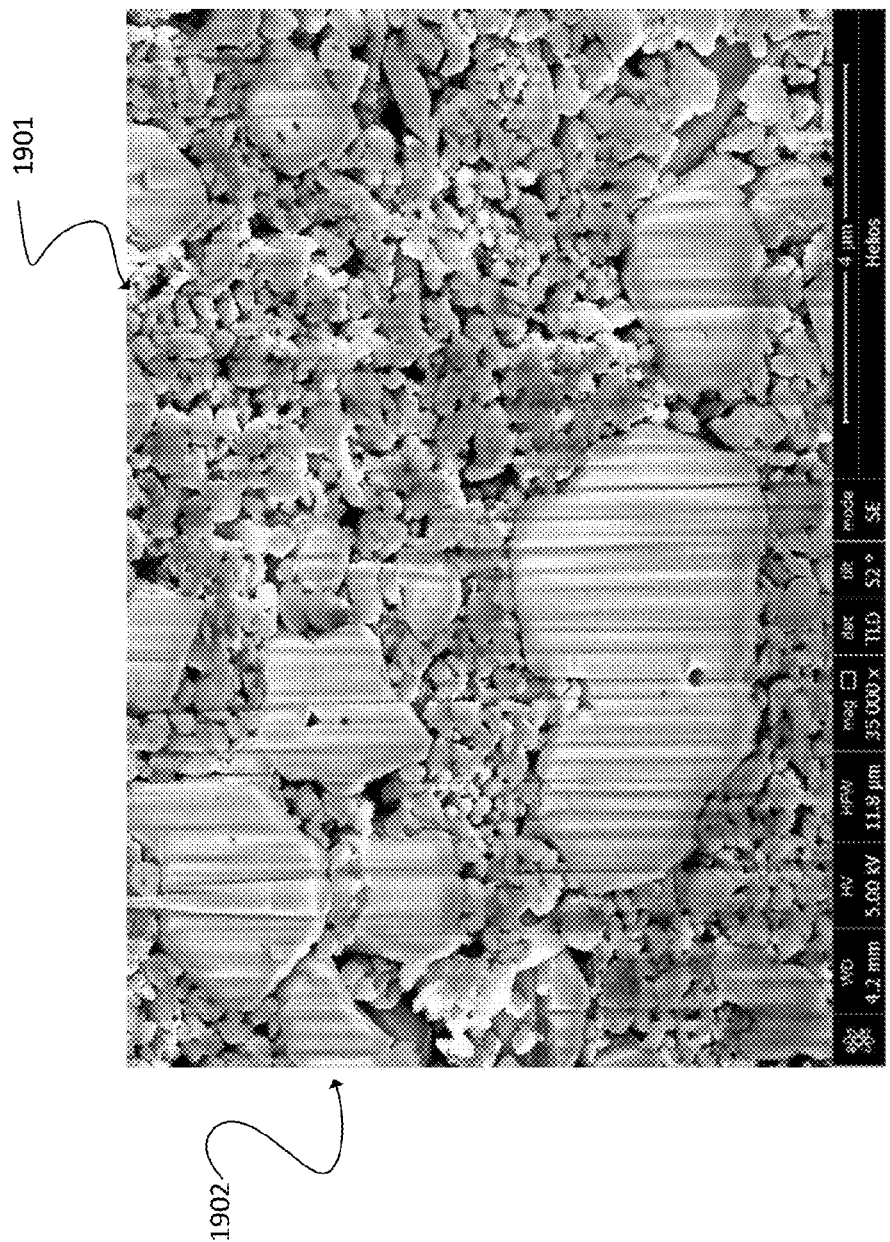
FIG. 19 shows a scanning electron microscopy (SEM) image for an example cathode having a 5:1 size ratio for large particle sizes ($Al_2O_3$) to small particle sizes (LSTPS sulfide catholyte).
Figure 20:
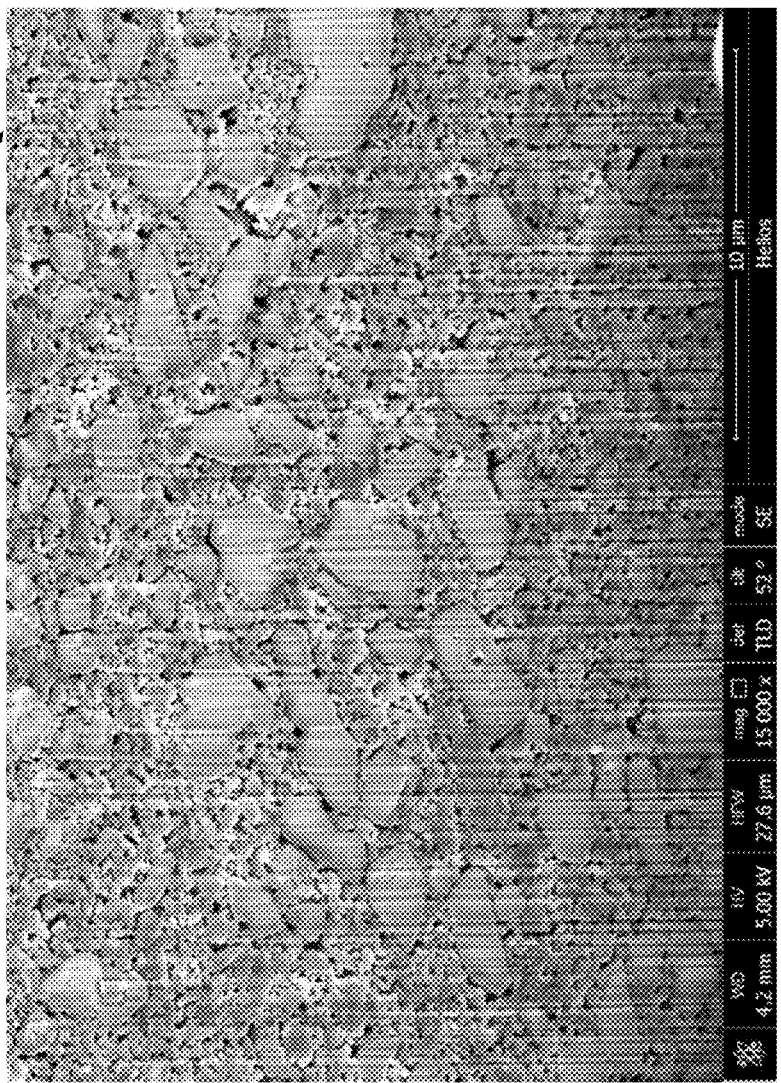
FIG. 20 shows a scanning electron microscopy (SEM) image for an example cathode having a 5:1 size ratio for large particle sizes ($Al_2O_3$) to small particle sizes (LSTPS sulfide catholyte).

As shown in FIG. 19, the $Al_2O_3$ particles (1902) had an approximate particle diameter of about 0.75-4 μm and the LSTPS particles (1901) had an approximate particle diameter of about 250 nm. As shown in FIG. 20, the $Al_2O_3$ particles (2002) and the LSTPS particles (2001) are homogenously mixed. The LSTPS particles (2001) are observed to neck together and form a percolation network.

Figure 21:
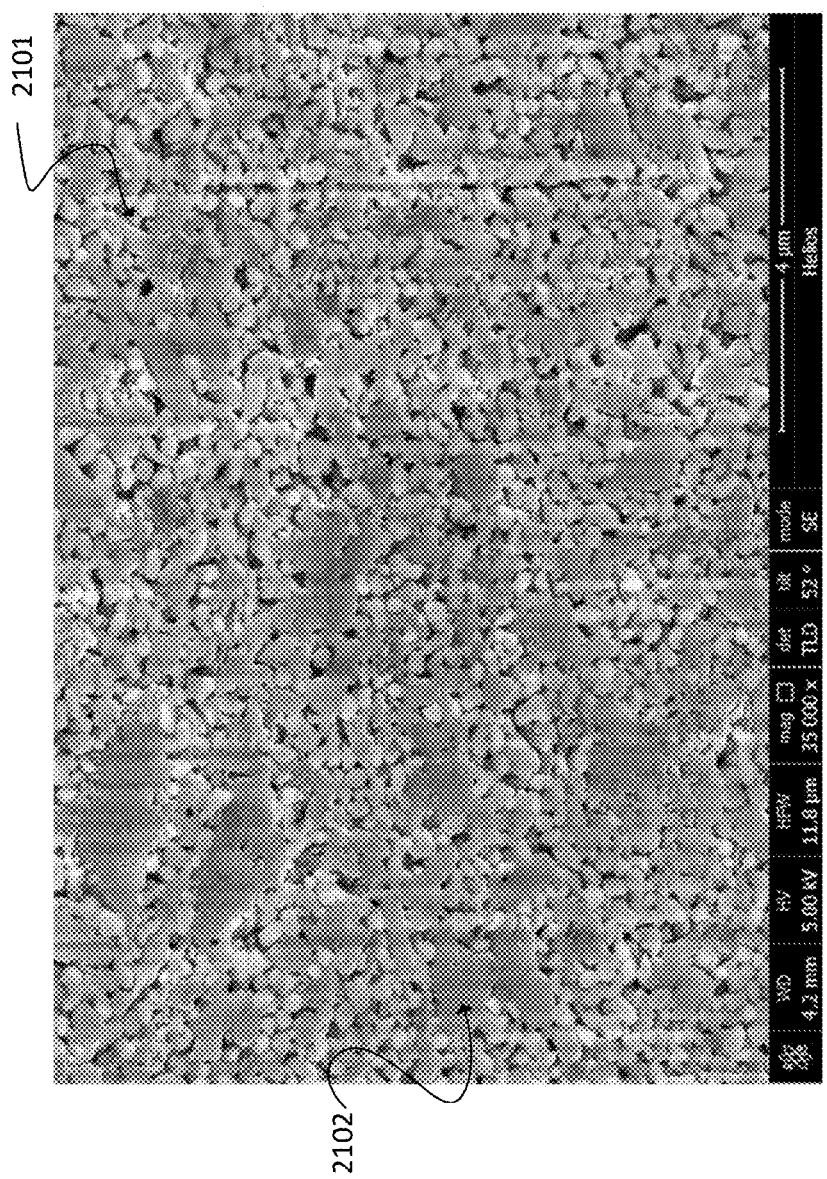
FIG. 21 shows a SEM image for an example cathode having a 1:1 size ratio for large particle sizes ($Al_2O_3$) to small particle sizes (LSTPS sulfide catholyte).
Figure 22:
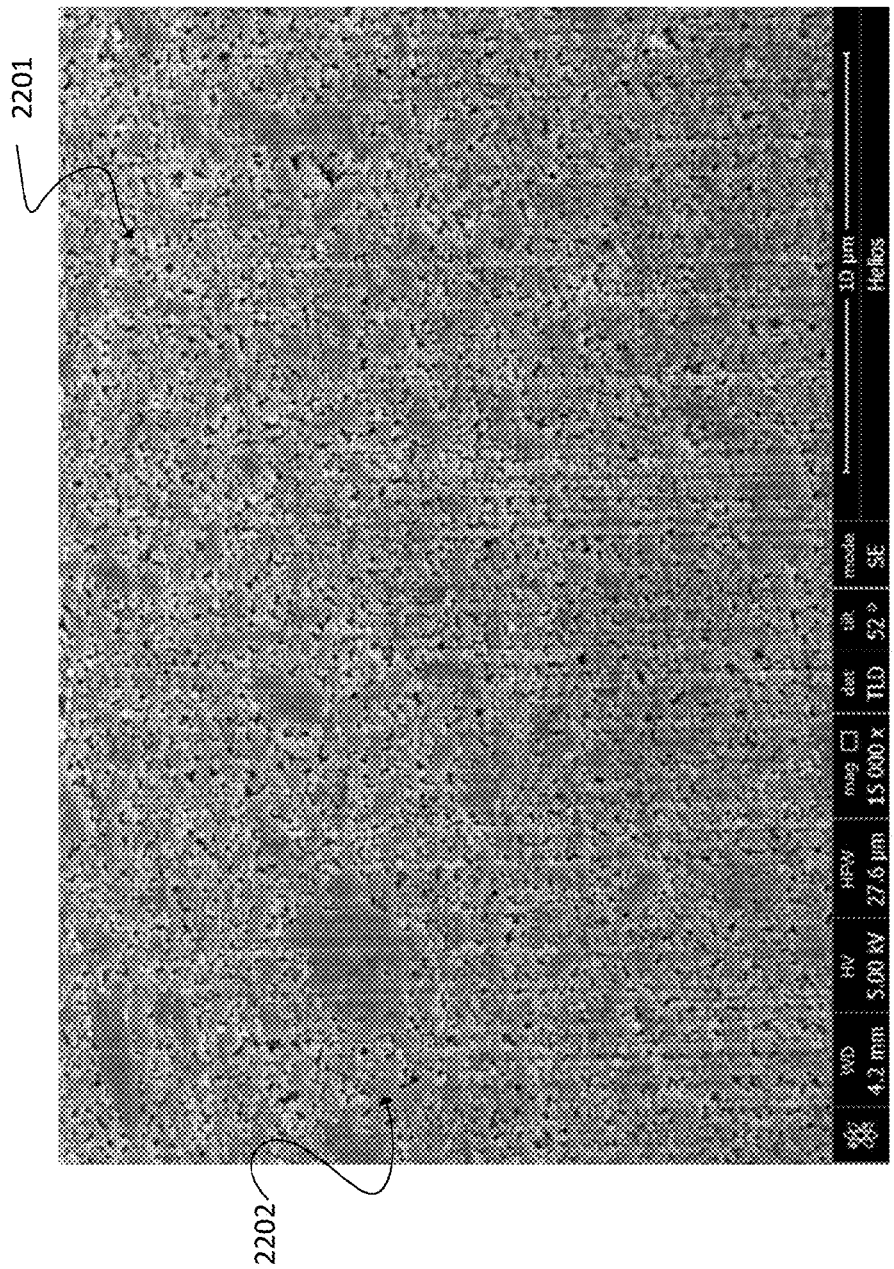
FIG. 22 shows a SEM image for an example cathode having a 1:1 size ratio for large particle sizes ($Al_2O_3$) to small particle sizes (LSTPS sulfide catholyte).

As shown in FIG. 21, the $Al_2O_3$ particles (2102) had an approximate particle diameter of about 250 nm and the LSTPS particles (2101) had an approximate particle diameter of about 250 nm. As shown in FIG. 22, the $Al_2O_3$ particles (2202) and the LSTPS particles (2201) are homogenously mixed. The LSTPS particles (2201) are observed to neck together but only within smaller domains of about 5-20 μm. The $Al_2O_3$ particles (2202) and the LSTPS particles (2001) do not allow the same extensive percolation network to form as was the case in FIG. 18.

Figure 27:
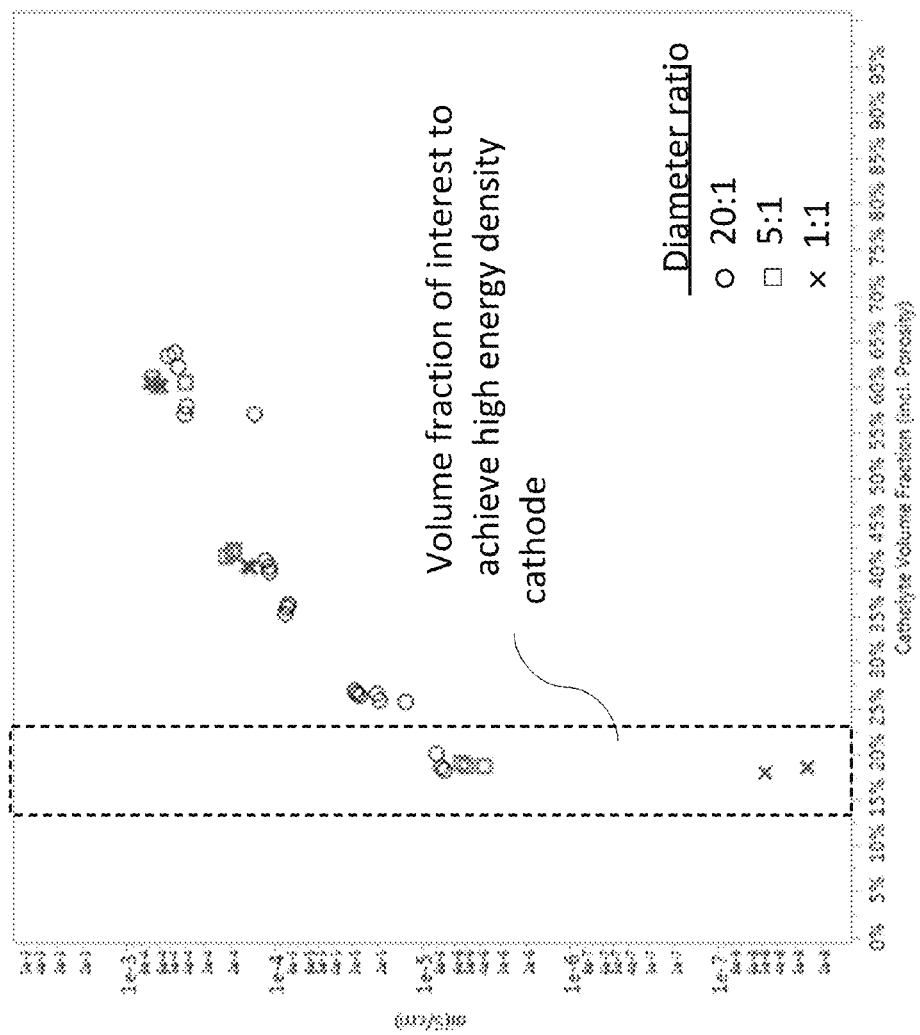
FIG. 27 shows a plot of conductivity as a function of catholyte volume fraction for various large:small particle size ratios.

As shown in FIG. 27, related experiments were conducted to observe the change in conductivity as a function of the volumetric amount of catholyte in the electrode. In order to achieve high energy densities in an electrochemical cell, the majority of the positive electrode should be active material and the minority of the positive electrode should be catholyte material (low amounts of catholyte). FIG. 27 shows that at low catholyte volume fractions, the difference in conductivity for an electrode having a large particle size to small particle size ratio of 1:1 is two orders of magnitude less than the conductivity of an electrode having a large particle size to small particle size ratio of at least 5:1 or greater.

Example 3

Increasing Large Particle Loading

Figure 23:
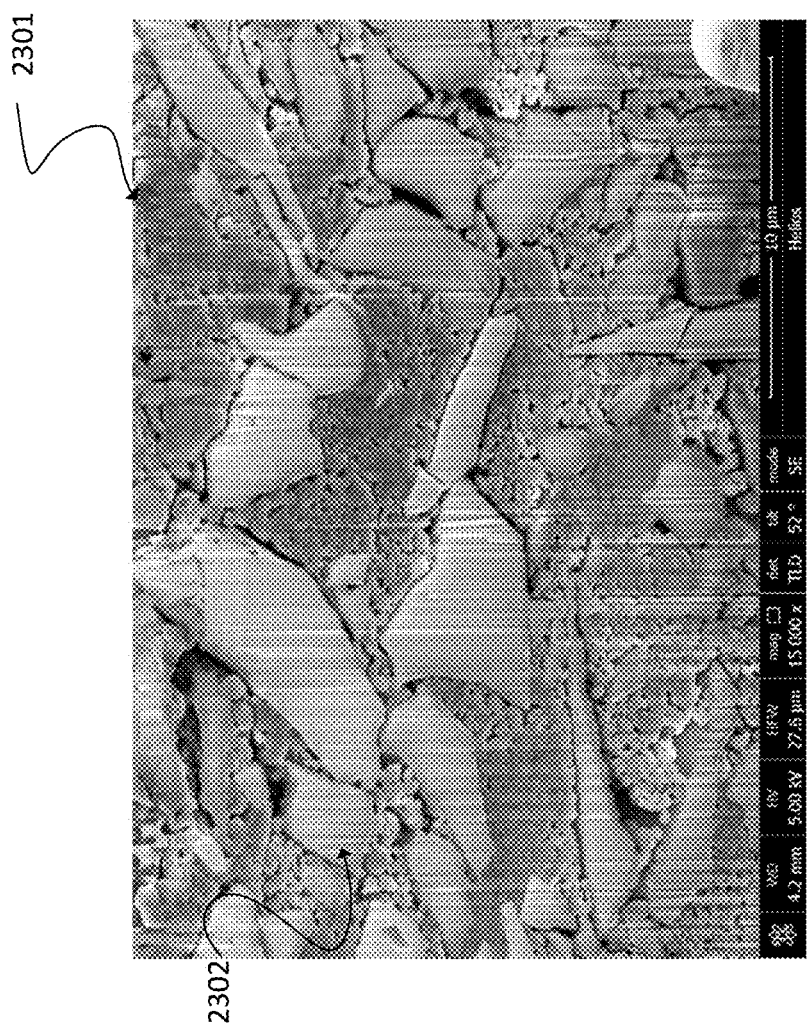
FIG. 23 shows a scanning electron microscopy (SEM) image for an example cathode having a 20:1 size ratio for large particle sizes ($Al_2O_3$) to small particle sizes (LSTPS sulfide catholyte) in which the weight ratio for large particle sizes ($Al_2O_3$) to small particle sizes (LSTPS sulfide catholyte) was 80:18.
Figure 24:
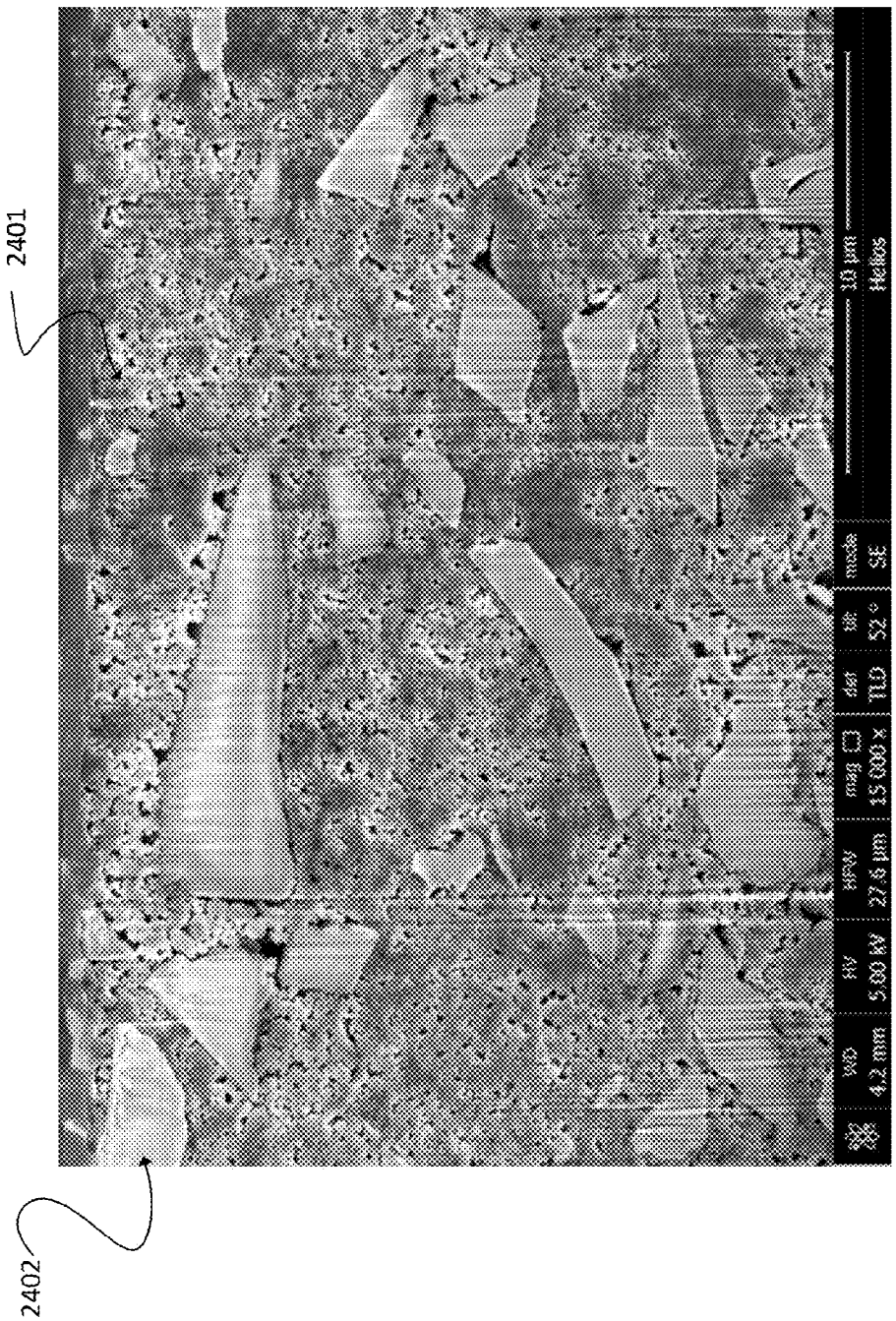
FIG. 24 shows a scanning electron microscopy (SEM) image for an example cathode having a 20:1 size ratio for large particle sizes ($Al_2O_3$) to small particle sizes (LSTPS sulfide catholyte) in which the weight ratio for large particle sizes ($Al_2O_3$) to small particle sizes (LSTPS sulfide catholyte) was 44:54.

As noted above, the smaller sized particles of sulfide catholyte tend to form a percolating network when the large:small particle size ratio is at least 4:1 or greater. Since, in this Example, the large particles represent cathode active materials, one would like to maximize the amount of cathode active materials in the electrode formulation while still maintaining a sufficient amount of catholyte particles to ensure a high ionic conductivity. FIGS. 23 and 24 show an electrode formulation of $Al_2O_3$ particles (2302 and 2402) and LSTPS particles (2301 and 2401) in which the $Al_2O_3$:LSTPS particle size ratio was 20:1. As shown in FIGS. 23 and 24, the $Al_2O_3$ particles (2302 and 2402) and the LSTPS particles (2301 and 2201) are homogenously mixed. The LSTPS particles (2301 and 2401) are observed to neck together. In FIG. 23, the volumetric ratio for $Al_2O_3$:LSTPS particle was 80:20. In FIG. 24, the volumetric ratio for $Al_2O_3$:LSTPS particle was 44:54. Higher amounts for $Al_2O_3$:LSTPS particle are likely possible with improved mixing engineering.

Example 4

Milling Electrode Particles

In the Examples herein, $Al_2O_3$ and LSTPS are milled to a variety of sizes in order to prepare electrode formulations having particular $Al_2O_3$:LSTPS particle size ratios. In one Example, the particles were milled as shown in FIG. 25.

Figure 25:
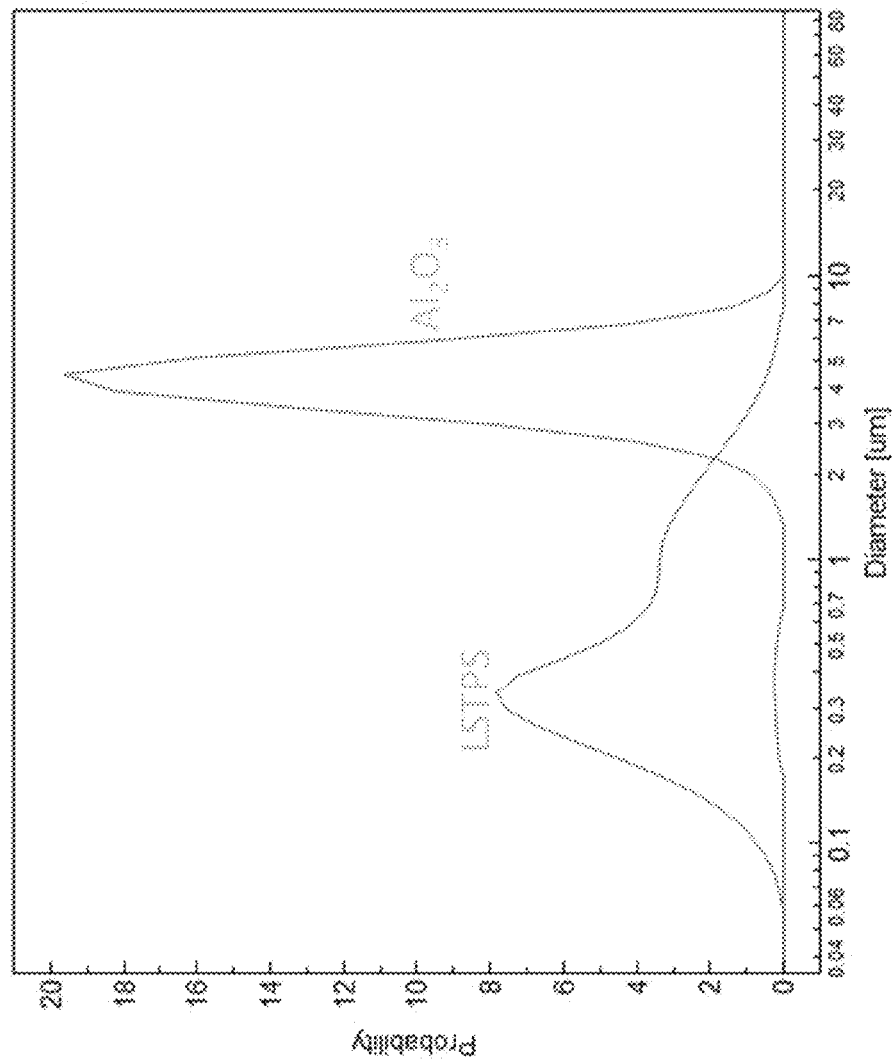
FIG. 25 shows an example particle size distribution for milled LSTPS and $Al_2O_3$ used in certain Examples herein.

As shown in FIG. 25, the $Al_2O_3$:LSTPS particle, in this Example, were milled to have the following sizes:

| Particle size (Diameter, μm) | $D_{10}$ | $D_{50}$ | $D_{90}$ |
|---|---|---|---|
| LSTPS | 0.17 | 0.4 | 1.7 |
| $Al_2O_3$ | 2.6 | 4.0 | 5.6 |

Example 5

Milling Electrode Particles

In the Examples herein, Nickel Cobalt Aluminum Oxide (NCA) and LSTPS are milled to a variety of sizes in order to prepare electrode formulations having particular NCA:LSTPS particle size ratios. In one Example, the particles were milled as shown in FIG. 26.

Figure 26:
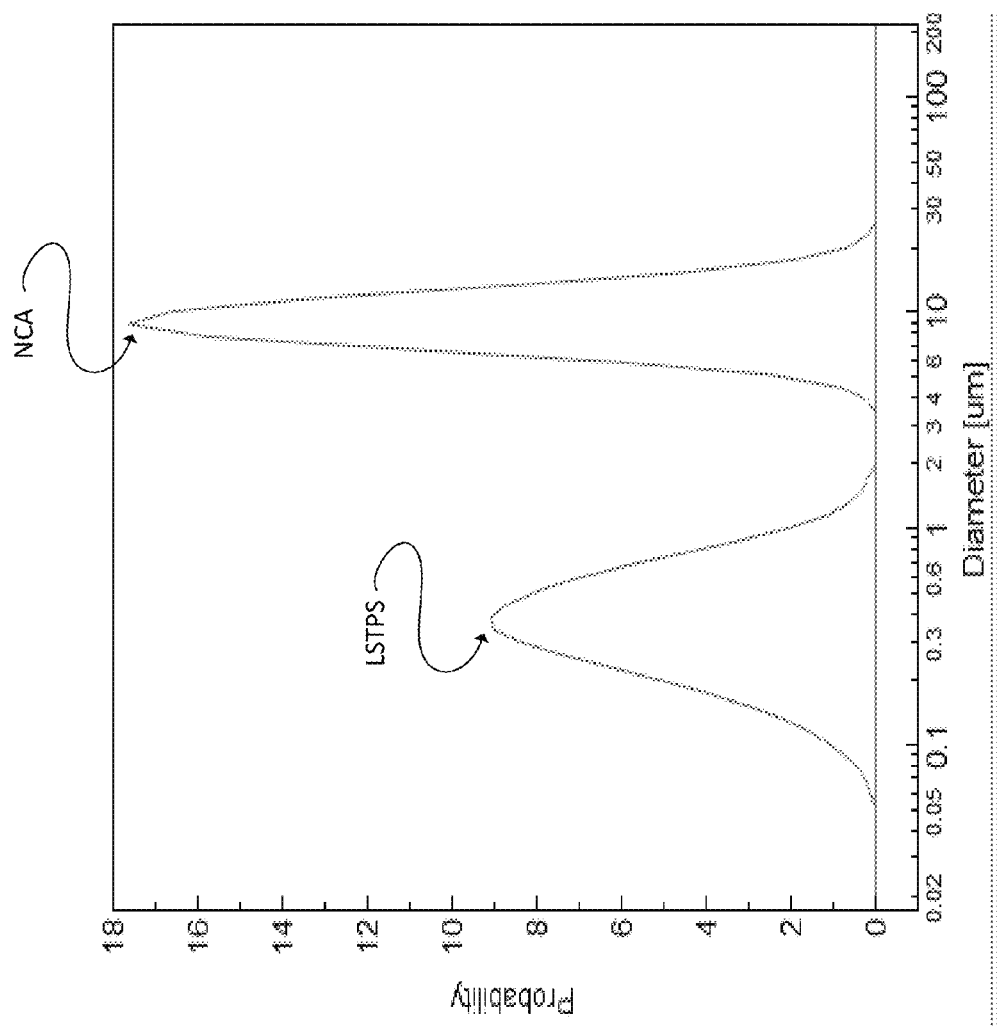
FIG. 26 shows an example particle size distribution for milled LSTPS and NCA used in certain Examples herein.

As shown in FIG. 26, the NCA:LSTPS particle, in this Example, were milled to have the following sizes:

| Particle size (Diameter, μm) | $D_{10}$ | $D_{50}$ | $D_{90}$ |
|---|---|---|---|
| LSTPS | 0.15 | 0.34 | 0.71 |
| NCA | 5.91 | 8.6 | 12.7 |

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. A solid state electrode of an electrochemical device comprising:
    a first plurality of particles of electrochemically active material, the first plurality of particles having a first particle size distribution characterized by a first dispersity of 0.25 or less and a first median diameter; and
    a second plurality of particles of ion conductive material, the second plurality of particles having a second particle size distribution characterized by a second dispersity of 0.25 or less and a second median diameter, the second median diameter being at least three times smaller than the first median diameter;
    wherein the electrode is characterized by a porosity of less than 10% by volume.

2. The electrode of claim 1, wherein the electrode comprises a volume fraction of second particles of less than 20% relative to a total particle volume of the electrode.

3. The electrode of claim 1, wherein the ion conductive material comprises $Li_aX_bP_cS_dO_e$, where X=Si, Ge, Al, Sn, and combinations thereof, and where 5≤a≤15, 0<b≤3, 1≤c≤4, 6≤d≤18 and 0<e≤5.

4. The electrode of claim 1, wherein the ion conductive material comprises a member selected from the group consisting of $Li_2S$—$SiS_2$, $Li_2S$—$SiS_2$—LiI, $Li_2S$—$SiS_2$—$Li_3MO_4$, $Li_2S$—$SiS_2$—$Li_3MO_3$, $Li_2S$—$P_2S_5$—LiI, and LATS, where M is a member selected from the group consisting of Si, P, Ge, B, Al, Ga, and In.

5. The electrode of claim 1, further comprising an electron conductive additive, the electron conductive additive comprising acetylene black, carbon black, activated carbon, C65, C45, VGCF, carbon fibers, carbon nanotubes, ketjen black, or a combination thereof.

6. The electrode of claim 1, further comprising a binder material, the binder material selected from a rubber or a polymer.

7. The electrode of claim 1, further comprising a percolating network, wherein a fraction of the second plurality of particles participates in the percolating network at a ratio of greater than 80%.

8. The electrode of claim 1, wherein the total ionic conductivity of the electrode is greater than 1% of the conductivity of the bulk ion conductive material.

9. The electrode of claim 1, wherein the second median diameter is at least four times smaller than the first median diameter.

10. A solid state battery comprising the solid state electrode of claim 1, a solid state electrolyte, and a lithium metal anode.

11. A solid state electrochemical electrode comprising:
    active materials characterized by a first particle size distribution having a first median particle size;
    catholyte materials characterized by a second particle size distribution having a second median particle size;
    wherein the volumetric ratio of active materials to catholyte materials is from 99:1 to 1:1; and
    wherein the particle size ratio of the first median particle size to the second median particle size is at least 3:1 or greater; and wherein the electrochemical electrode has a porosity of less than 10% by volume.

12. The electrode of claim 11, wherein the first particle size distribution has a dispersity of 0.25 or less.

13. The electrode of claim 11, wherein the second particle size distribution has a dispersity of 0.25 or less.

14. The electrode of claim 11, further comprising an electron conductive additive, the electron conductive additive comprising acetylene black, carbon black, activated carbon, C65, C45, VGCF, carbon fibers, carbon nanotubes, ketjen black, or a combination thereof.

15. The electrode of claim 11, further comprising a binder material, the binder material selected from a rubber or a polymer.

16. The electrode of claim 11, wherein the catholyte materials form a percolating network.

17. The electrode of claim 16, wherein more than 80% of the catholyte materials in the electrode are bonded within the percolating network.

18. An electrochemical cell comprising
an anode current collector;
an anode in direct contact with the anode current collector;
an electrolyte in direct contact with the anode, the anode being positioned between the anode current collector and the electrolyte, and the electrolyte being characterized by an ionic conductivity of at least 1 e-4 S/cm; and
a solid state positive electrode in direct contact with the electrolyte and comprising:
active materials characterized by a first particle size distribution having a first median particle size;
catholyte materials characterized by a second particle size distribution having a second median particle size;
wherein the volumetric ratio of active materials to catholyte materials is from 99:1 to 1:1; and
wherein the particle size ratio of the first median particle size to the second median particle size is at least 3:1 or greater; and
wherein the positive electrode has a porosity of less than 10% by volume.

19. The cell of claim 18, wherein the first particle size distribution has a dispersity of 0.25 or less.

20. The cell of claim 18, wherein the second particle size distribution has a dispersity of 0.25 or less.

21. The cell of claim 18, wherein the catholyte materials form a percolating network.

22. The cell of claim 21, wherein more than 80% of the catholyte materials in the positive electrode are bonded within the percolating network.

* * * * *

UNITED STATES PATENT AND TRADEMARK OFFICE
CERTIFICATE OF CORRECTION

| | |
|---|---|
| PATENT NO. | : 9,859,560 B2 |
| APPLICATION NO. | : 14/724611 |
| DATED | : January 2, 2018 |
| INVENTOR(S) | : Tim Holme et al. |

It is certified that error appears in the above-identified patent and that said Letters Patent is hereby corrected as shown below:

On the Title Page

Applicant name item (71) replace "QuantumScape Corporation" with --QuantumScape Battery, Inc.--.

Signed and Sealed this
Fifth Day of March, 2024

Katherine Kelly Vidal
*Director of the United States Patent and Trademark Office*